US008637693B2

(12) United States Patent
Kang et al.

(10) Patent No.: US 8,637,693 B2
(45) Date of Patent: Jan. 28, 2014

(54) SINGLE WALLED METAL OXIDE NANOTUBES

(75) Inventors: Dun-Yen Kang, Atlanta, GA (US); Sankar Nair, Atlanta, GA (US); Christopher Jones, Atlanta, GA (US)

(73) Assignee: Phillips 66 Company, Houston, TX (US)

( * ) Notice: Subject to any disclaimer, the term of this patent is extended or adjusted under 35 U.S.C. 154(b) by 274 days.

(21) Appl. No.: 13/049,375

(22) Filed: Mar. 16, 2011

(65) Prior Publication Data

US 2011/0230672 A1 Sep. 22, 2011

Related U.S. Application Data

(60) Provisional application No. 61/315,457, filed on Mar. 19, 2010, provisional application No. 61/406,523, filed on Oct. 25, 2010, provisional application No. 61/407,274, filed on Oct. 27, 2010.

(51) Int. Cl.
*C07F 19/00* (2006.01)
*C07F 7/02* (2006.01)
*C07F 5/06* (2006.01)

(52) U.S. Cl.
USPC .............................. 556/173; 977/762; 977/896

(58) Field of Classification Search
USPC .............................. 556/173; 977/672, 896, 762
See application file for complete search history.

(56) References Cited

U.S. PATENT DOCUMENTS

| 4,874,518 | A | 10/1989 | Kirkland et al. |
| 2002/0090330 | A1 | 7/2002 | Smalley et al. |
| 2004/0048744 | A1 | 3/2004 | Iijima et al. |
| 2008/0213487 | A1 | 9/2008 | Park et al. |

FOREIGN PATENT DOCUMENTS

WO PCT/US11/28649 3/2011

OTHER PUBLICATIONS

Mukherjee et al., Chemistry of Materials, vol. 17, No. 20, pp. 4900-4909 (2005).*
Johnson et al., Journal of American Chemical Society, vol. 110, No. 25, pp. 8545-8547 (1988).*
Li et al., "The electronic structure of a single-walled aluminosilicate nanotube." Nanotechnology, vol. 19, No. 17, pp. 175702 (9pp), 2008.
Yuan et al., "Functionalization of Halloysite Clay Nanotubes, by Grafting with gamma-Aminopropyltriethoxysilane", J. Phys. Chem. C, vol. 112, pp. 15742-15751, 2008.
Zheng., "Synthesis and Modification of Metal Oxide Nanostrustures and Their Applications." 1999 (avaliable online at http://eprints.qut.edu.au/31728/1/Zhanfeng_Zheng_Thesis.pdf).
Yang et al., "Growth Mechanism of Synthetic Imogolite Nanotubes." Chem. Mater., vol. 20, No. 13, pp. 4484-4488, 2008.
Lvov et al., "Halloysite Clay Nanotubes for Controlled Release of Protective Agents," ACS Nano. vol. 2, No. 5, pp. 814-820, May 2008.

* cited by examiner

*Primary Examiner* — Porfirio Nazario Gonzalez
(74) *Attorney, Agent, or Firm* — Gardere Wynne Sewell LLP; Teresa J. Lechner-Fish

(57) ABSTRACT

Provided herein are methods for dehydrating single-walled metal oxide nanotubes by heating the SWNT under vacuum at 250-300° C.; methods of dehydroxylating SWNT, comprising heating the SWNT under vacuum at 300-340° C., and methods for maximizing the pore volume of a SWNT, comprising heating the SWNT at 300° C. under vacuum to partially dehydroxylate and dehydrate the SWNT; methods of modifying the inner surface of a single walled aluminosilicate nanotube (SWNT), comprising dehydration or dehydration and dehydroxylation, followed by reacting the SWNT with a derivative under anhydrous conditions to produce a SWNT that is derivatized on its inner surface. The invention also includes single-walled nanotubes produced by the methods of the invention.

18 Claims, 19 Drawing Sheets

Illustration of SWNT modified by various reagents.

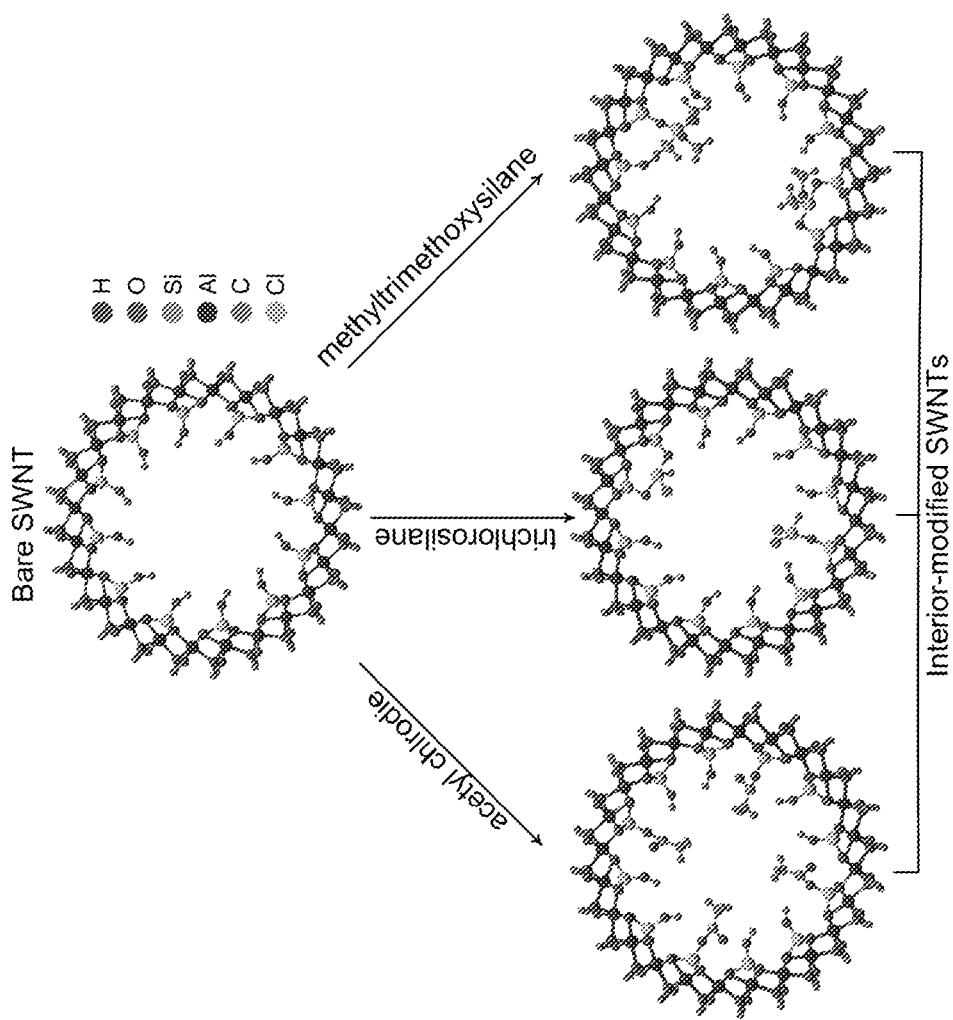
Figure 11. Illustration of SWNT modified by various reagents.

FIGURE 12A: Reaction Schemes
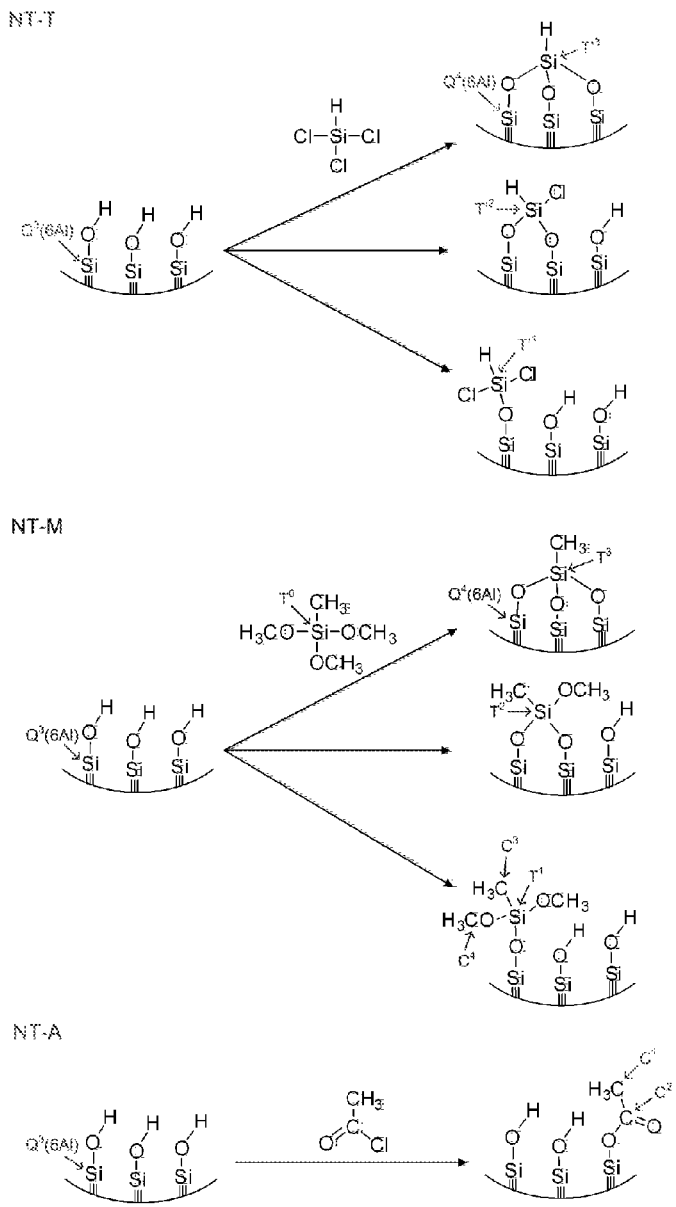
Scheme 1: Reactions at SWNT interior by various reagents: acetyl chloride, methyltrimethoxysilane, and trichlorosilane, denoted by NT-AcCl, NT-MTMS, and NT-TClS respectively.

FIGURE 12B: Additional Reaction Schemes
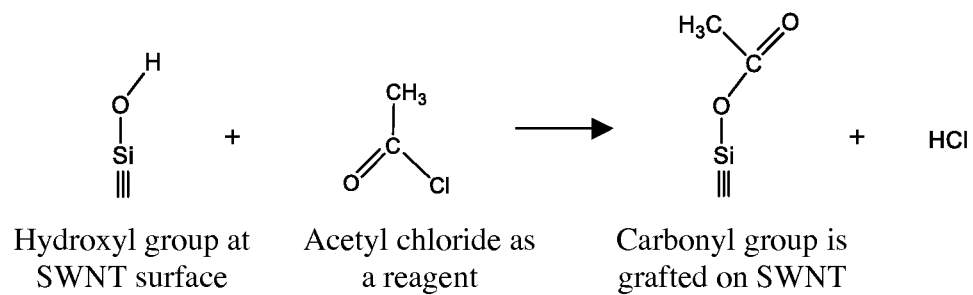
Hydroxyl group at SWNT surface + Acetyl chloride as a reagent → Carbonyl group is grafted on SWNT + HCl
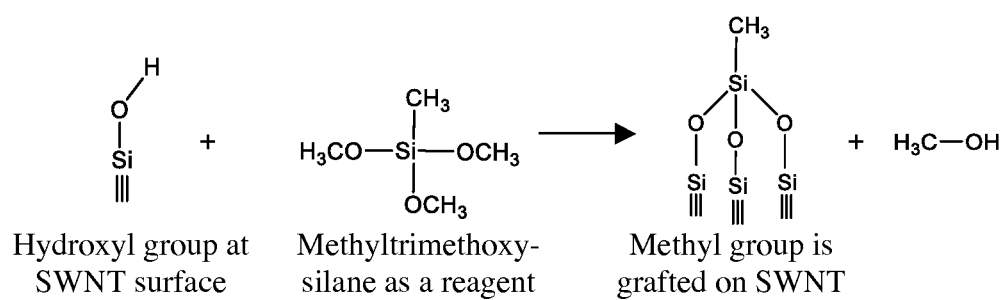
Hydroxyl group at SWNT surface + Methyltrimethoxy-silane as a reagent → Methyl group is grafted on SWNT + H$_3$C—OH
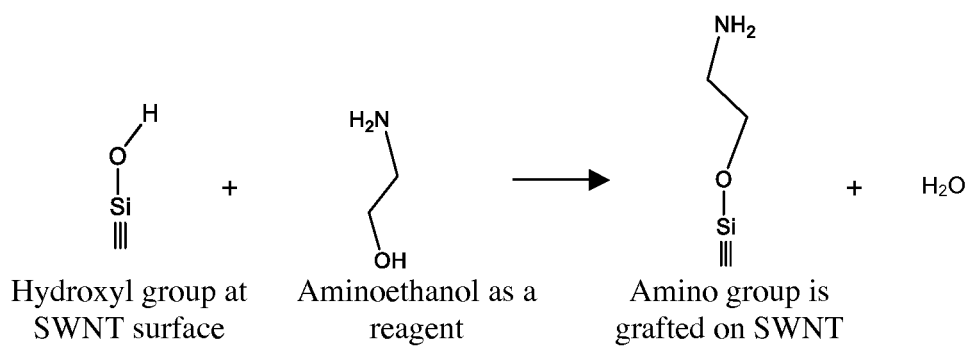
Hydroxyl group at SWNT surface + Aminoethanol as a reagent → Amino group is grafted on SWNT + H$_2$O FIGURE 13
FIG. 13A
FIG. 13B
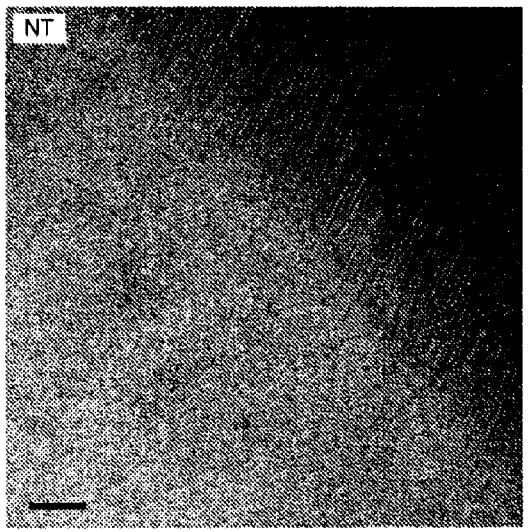
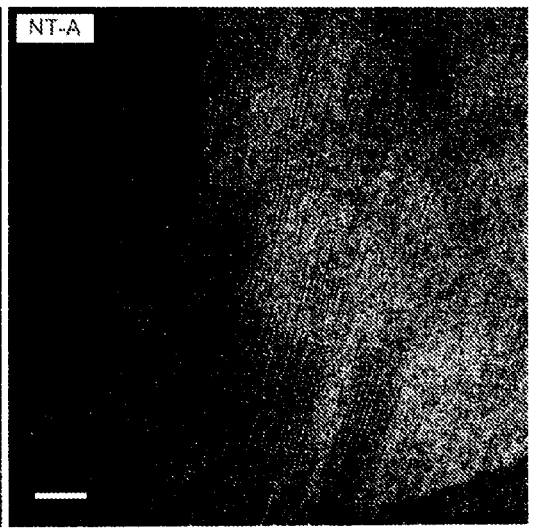
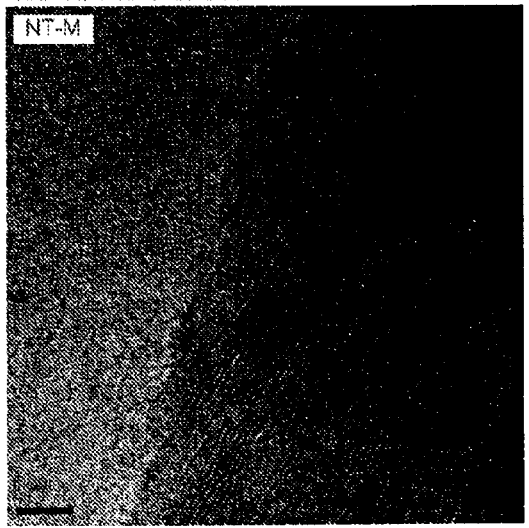
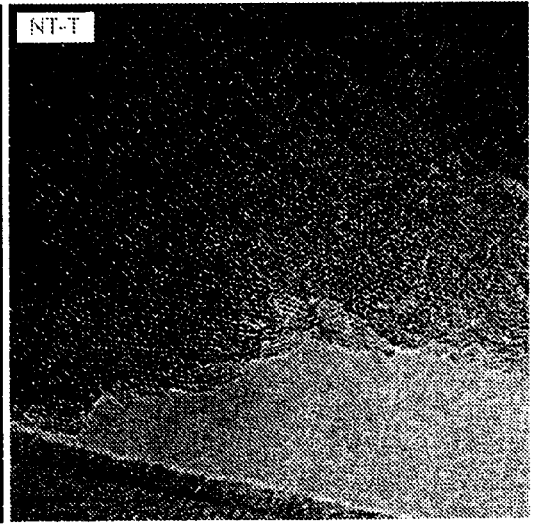
FIG. 13C
FIG. 13D

FIGURE 14

Table 1. SWNT sample porosity derived from nitrogen physisorption data

| sample | BET method | t-plot method | |
|---|---|---|---|
| | $S_{BET}$ (m$^2$/g-Al$_2$O$_3$SiO$_2$) | $V_{mp}$ (cm$^3$/g-Al$_2$O$_3$SiO$_2$) | $S_{ext}$ (m$^2$/g-Al$_2$O$_3$SiO$_2$) |
| NT | 418 | 0.17 | 10.1 |
| NT-A | 256 | 0.11 | 15.9 |
| NT-M | 153 | 0.06 | 11.3 |
| NT-T | 260 | 0.11 | 14.0 |

FIGURE 15

Table 2. Normalized weight of water/hydroxyl groups/organic groups in as-synthesised and

| sample | normalized mass | | |
|---|---|---|---|
| | physisorbed water ($g-H_2O/g-Al_2O_3SiO_2$ %) | hydroxyl group ($g-OH/g-Al_2O_3SiO_2$) | organic group ($g-organic/g-Al_2O_3SiO_2$ %) |
| NT | 30.9 | 21.3 | --- |
| NT-A | 15.3 | 19.4 | 12.6 |
| NT-M | 12.5 | 14.5 | 9.2 |
| NT-T | 13.3 | 13.6 | 8.2 | modified SWNT samples determined by TGA

FIGURE 16

Table 3. Monolayer coverage fitted from water adsorption BET plots

| sample | $n_m$ (g-$H_2O$/g-$Al_2O_3SiO_2$) |
|---|---|
| NT | 0.174 |
| NT-A | 0.118 |
| NT-M | 0.107 |
| NT-T | 0.131 |

FIGURE 17

Table 4. Fractional silanol substitution in bare and modified SWNTs

| sample | fractional silanol substitution (# of silanols being substituted in modified SWNT/ # of silanols in bare SWNT) | | | |
| --- | --- | --- | --- | --- |
| | TGA | $N_2$ physisorption (liquid density) | $N_2$ physisorption (molecular size) | Water adsorption |
| NT-A | 0.35 | 0.25 | 0.34 | 0.32 |
| NT-M | 0.33 | 0.24 | 0.37 | 0.38 |
| NT-T | 0.26 | 0.28 | 0.30 | 0.25 |

SINGLE WALLED METAL OXIDE NANOTUBES

CROSS-REFERENCE TO RELATED APPLICATIONS

This application claims priority to U.S. Provisional Application Nos. 61/315,457, filed Mar. 19, 2010, 61/406,523 filed Oct. 25, 2010, and U.S. 61/407,274 filed Oct. 27, 2010, each incorporated by reference in its entirety.

STATEMENT REGARDING FEDERALLY SPONSORED RESEARCH OR DEVELOPMENT

Not applicable.

BACKGROUND OF THE INVENTION

Synthetic metal oxide single-walled nanotubes (SWNTs) can be expected to possess a number of interesting and unique properties, and are of interest in a number of applications such as molecular separation, chemical sensing, catalysis, and photonics. Although the number of such SWNT materials is not yet extensive, one attractive aspect of such materials is that they can be fabricated by liquid-phase synthesis under moderate conditions.

More specifically, a particular metal oxide (aluminosilicate) SWNT, which is a synthetic version of the nanotubular mineral imogolite, has attracted substantial interest in recent years. This SWNT consists of a tubular aluminum(III) hydroxide layer on the outer surface with pendant silanol groups on the inner surface (FIG. 1a). Additionally, the proposed mechanisms of single-walled metal oxide nanotube growth allow several possible ways of controlling the monodispersity, composition, and structure of the nanotube product.

A long-standing issue in nanotube science and engineering is the modification (functionalization) of SWNT surfaces. Modification of the inner or outer surface of the nanotube with functional entities would greatly expand both their properties and their applications. For example, an outer-surface modification could increase their compatibility with a solid- or liquid-phase materials, whereas an inner-surface modification would be advantageous for shape/size-selective separations and catalysis.

Diverse approaches for outer-surface modification of carbon nanotubes have been reported. However, the modification of the inner wall of carbon nanotubes is much more difficult, due to the low reactivity of the inner wall, as well as due to the mesoporous and microporous silicas. The capability to control the chemistry of the inner surface of the aluminosilicate SWNTs thus has significant implications for nanotube science and engineering.

There have been several reports on the outer-surface modification of single-walled aluminosilicate nanotubes. However—as in the case of carbon nanotubes—inner wall modification is much more difficult, and no convincing results suggesting inner wall functionalization have been published. We hypothesize that the extraordinarily high surface silanol density of the inner wall (~9.1 —OH/nm$^2$) makes the material highly hydrophilic at ambient conditions (FIG. 1b), and that the strong binding of water molecules to the inner wall hinders functionalization of the inner surface.

Therefore, a comprehensive knowledge of dehydration and subsequent dehydroxylation phenomena (due to condensation of hydroxyls) on the SWNT surface is critical for accessing reactive surface sites and for creating a new class of inner-wall-functionalized SWNT materials.

Previous studies have reported on the dehydration, dehydroxylation and pore collapse in these SWNTs via solid-state NMR, infrared spectroscopy (IR), thermogravimetric analysis (TGA) and X-ray diffraction (XRD). However, such studies reach varying conclusions on many issues, for instance the heat treatment temperature required to completely dehydrate the inner wall, and the temperature required for nanotube collapse. Previous studies have proposed dehydroxylation models in the absence of definitive supporting evidence. Furthermore, a quantitative study on the pore volume of the SWNT in different dehydrated and dehydroxylation conditions—a prerequisite for inner-wall modification studies—is still lacking.

Herein we report a systematic qualitative and quantitative investigation of dehydration and dehydroxylation phenomena in aluminosilicate SWNTs over a wide temperature range of 25-450° C. The structure and composition of the SWNT is assessed by a combination of techniques including in situ XRD, FTIR, NMR, TGA-MS, and N$_2$ physisorption. Based upon our results, a quantitative model is proposed for the dehydration and dehydroxylation phenomena occurring in the SWNT upon heat treatment. Furthermore, a unique rehydroxylation phenomenon that occurs in the dehydrated SWNT upon re-exposure to water is elucidated. As a result, this study leads to the preparation of a range of well-characterized heat-treated materials amenable to inner-wall surface functionalization.

BRIEF SUMMARY OF THE INVENTION

We report methods for dehydrating, dehydroxylating, and rehydroxylating single walled metal oxide nanotubes (SWNT) to create materials suitable for the above applications. Preferably, the metal oxide nanotube is an aluminosilicate nanotube, but others include aluminogermanate, nickel phyllosilicate nanotubes, or any metal oxide nanotube having hydroxyl groups on the inner-wall surface.

Our research proves that a completely dehydrated SWNT is achieved by heating at 250° C. under vacuum, and that the maximum pore volume is achieved at 300° C. under vacuum due to partial dehydroxylation of the dehydrated nanotube. Beyond 300° C., further dehydroxylation partially disorders the nanotube wall structure. However, a unique rehydroxylation mechanism can partially reverse these structural changes upon re-exposure to water vapor.

These observations enable a novel method of functionalizing the inner surface of such SWNTs, wherein the method comprises dehydration or dehydration and dehydroxylation as described, followed by functionalizing the inner surface under anhydrous conditions. Furthermore, the inner and outer surface can be differentially modified, for example, by reacting the outer surface under conditions where the inner surface is hydrated and thus nonreactive, followed by dehydration and subsequent functionalization of the inner surface. Using such techniques, a wide variety of functionalized SWNT become possible to produce.

The following list of abbreviations is provided for the convenience of the reader:

| ABBREVIATION | DEFINITION |
|---|---|
| SWNT | SINGLE WALLED NANOTUBES |
| GCMC | GRAND CANONICAL MONTE CARLO (A TYPE OF SIMULATION) |
| XRD | X RAY DIFFRACTION |
| FTIR | FOURIER TRANSFORM INFRARED SPECTROSCOPY |
| NMR | NUCLEAR MAGNETIC RESONANCE |
| TGA-MS | THERMOGRAVIMETRIC ANALYSIS-MASS SPECTROMETRY |
| DI | DEIONIZED |
| MAS | MAGIC ANGLE SPINNING |
| NIST | NATIONAL INSTITUTE OF STANDARDS AND TECHNOLOGY |
| DP | DIRECT POLARIZATION |
| CP | CROSS POLARIZATION |
| PPM | PARTS PER MILLION |
| RPM | REVOLUTIONS PER MINUTE |
| NU | NUMBER OF GIBBSITE UNITS IN NANOTUBE CIRCUMFERENCE |
| TEM | TRANSMISSION ELECTRON MICROSCOPY |
| $S_{BET}$ | TOTAL SURFACE AREA |
| $S_{EXT}$ | EXTERNAL SURFACE AREA |
| $V_{MP}$ | MICROPORE VOLUME |

DESCRIPTION OF THE FIGURES

The patent or application file contains at least one drawing executed in color. Copies of this patent or patent application publication with color drawing(s) will be provided by the Office upon request and payment of the necessary fee.

FIG. 11. Illustration of SWNT modified by various reagents.

FIGS. 12A and 12B. Reaction Schemes

FIG. 13. TEM images of as-synthesized and modified SWNT bundles. The scale bars (in black or white) represent 20 nm. The pairs of red arrows represent individual SWNTs, with approximately 2 nm diameter.

FIG. 14. Table 1. SWNT sample porosity derived from nitrogen physisorption data.

FIG. 15. Table 2. Normalized weight of water/hydroxyl groups/organic groups in as-synthesized and modified SWNT samples determined by TGA.

FIG. 16. Table 3. Monolayer coverage fitted from water adsorption Brunauer-Emmett-Teller (BET) plots.

FIG. 17. Table 4. Fractional silanol substitution in bare and modified SWNTs.

DETAILED DESCRIPTION OF THE INVENTION

Figure 1:
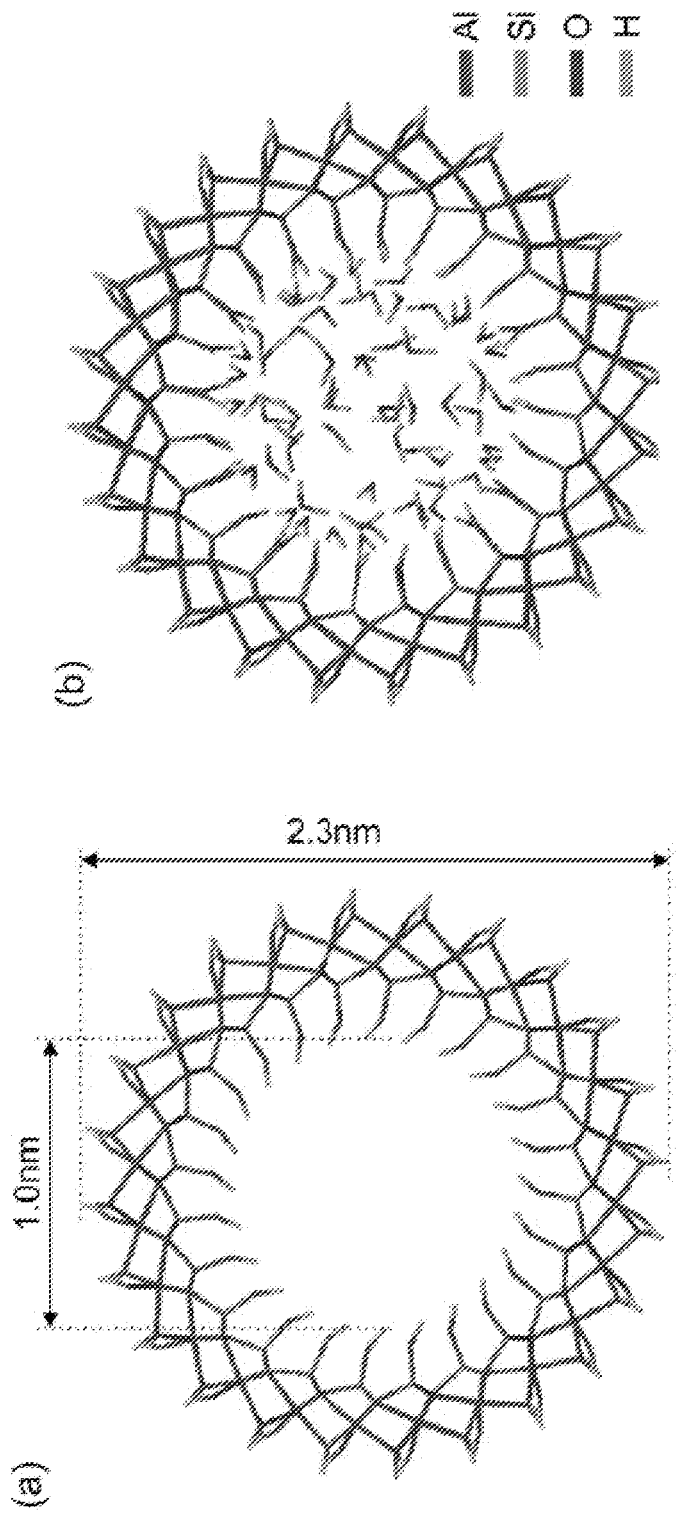
FIG. 1. (a) Cross-section of single-walled aluminosilicate nanotute. (b) Example of a model of the hydrate SWNT, with 14 wt % of water physisorbed in the SWNT at ambient conditions.

The invention generally relates to methods of modifying nanotubes by dehydrating the inner surface of the nanotube by heating at 250-300° C. under vacuum. In preferred embodiments the invention is a method of modifying the inner surface of a SWNT, by heat treatment under vacuum at 250-300° C. until the SWNT has been dehydrated, followed by reacting the SWNT with a derivative under anhydrous conditions to produce a SWNT that is derivatized on its inner surface.

In another embodiment, the invention is a method of dehydroxylating SWNT, comprising heating the SWNT under vacuum at 340° C.

In yet another embodiment, the invention is a method of maximizing the pore volume of a SWNT, comprising heating the SWNT at 300-340° C. under vacuum to dehydroxylate and dehydrate the SWNT.

In other embodiments, the inner and outer surfaces can be differentially modified by functionalizing the outer surface under aqueous conditions, following by dehydration and functionalizing the inner surface under anhydrous conditions. The inner and outer surfaces can be treated the same, or differently. Functional groups can include metals, halides, fluorescent reporter molecules, biological reporter molecules, small molecule drugs, dopants, carboxylates, sulphates, nitrates, silanes, passivators, alkyls, aryls, acetyl chloride, aminoethanol, methyl-trimethoxysilane, trimethylmethoxysilane, trichlorosilane, and combinations thereof.

The invention also encompasses the SWNTs that result from each of the various treatments.

The following examples are illustrative only and do not serve to limit the scope of the appended claims.

EXAMPLE 1

Methods

SWNT Synthesis and Purification: Tetraethyl orthosilicate (TEOS) was mixed with aluminum tri-sec-butoxide in a glove box filled with nitrogen. The mixture was added to an aqueous 10 mM perchloric acid solution with a molar ratio Si:Al:$HClO_4$=1.1:2:1, under vigorous stirring at room temperature in ambient conditions for 24 hours. The solution was then diluted with DI water by a factor of 3.6 and refluxed at 95° C. for 4 days. Once the temperature was brought to 95° C., the solution turned from cloudy to clear in about one hour. After the solution was decreased to room temperature, a 30 wt % ammonia solution was added dropwise into the product solution until gelation of the suspended nanotubes occurred.

The gel was isolated by centrifugation at 7000 rpm for 15 min. The supernatant was discarded and a few drops of 10-N hydrochloric acid were added to the gel, thereby re-dispersing the nanotubes. The resulting viscous solution was purified by dialysis against DI water for 3 days using a 15,000-Dalton membrane. The purified suspension was dried at 60° C. to obtain a powder sample of the SWNTs.

Thermogravimetric Analysis and Mass Spectroscopy (TGA-MS): These experiments were performed on Netzsch STA449 thermogravimetric analyzer connected to a Netzsch QMS403 mass spectrometer. About 20 mg of SWNT sample was heated under He in the range of 25-700° C. Ion current channels of m/z=17 and m/z=18 were monitored during the experiment.

Nitrogen Physisorption: Nitrogen physisorption measurements were performed with a Micromeritics ASAP 2010 at 77 K. The nanotube sample was placed in an analysis tube, degassed, and heat-treated at the desired temperature for 12 hrs in a 25-millitorr vacuum before each measurement. Heat treatments at higher temperatures—e.g., 300-400° C.—were conducted in a separate 15-millitorr vacuum line for 5 hrs, and the sample was then transferred into the analysis tube in a nitrogen glove box before degassing and physisorption measurements.

To obtain a rehydrated nanotube sample, the sample after heat-treatment at 400° C. was cooled to room temperature and allowed to equilibrate in contact with saturated water vapor for 12 hours. In contrast to the other characterization methods reported here (which characterize the rehydrated sample directly), physisorption measurements were made on the rehydrated sample only after it was degassed under vacuum at 250° C.

Solid-State NMR: The nanotube sample for solid-state NMR experiments was first placed in a flask connected to a 15-millitorr vacuum line and heat-treated at the desired temperature for 5 hours. The rehydrated sample was treated by the method above. The treated sample was transferred to a nitrogen dry box and packed into a 7 mm rotor capped with one O-ring cap. $^1H$, $^{27}Al$ and $^{29}Si$ magic angle spin (MAS) NMR experiments were carried out on a Bruker DSX 300 spectrometer at frequencies of 276.2, 78.1 and 59.6 MHz, respectively.

For $^1H$ MAS NMR studies, the sample was spun at 5 kHz. A single pulse of $\pi/2$ and a repetition time of 4 seconds was used. The sample was spun at 5-6 kHz for $^{27}Al$ MAS NMR experiments, for which a single pulse of $\pi/6$ and a repetition time of 0.1 sec were used.

For $^{29}Si$ MAS NMR, direct-polarization (DP) and cross-polarization (CP) measurements were performed with repetition times of 10 sec and 5 sec respectively, with a $\pi/2$ single pulse and a 5 kHz spinning rate. The chemical shift of $^{27}Al$ was referenced to $AlCl_3$, and of $^1H$ and $^{29}Si$ to 3-(trimethylsilyl)-1-propanesulfonic acid sodium salt.

FT-IR: A 2-mg nanotube sample was mixed with 40 mg potassium bromide (KBr) and pressed into a pellet. The sample pellet was placed in a Harrick high temperature cell with KBr windows. The sample pellet was heat-treated under a 15-millitorr vacuum at various temperatures ranging from 25-450° C. for 5 hours each. The cell was then cooled to room temperature and filled with argon before conducting FTIR measurements. The FTIR spectra were obtained on a Bruker IFS 66v/S spectrometer with 256 scans and a resolution of 2 $cm^{-1}$. Peak area integrations were performed using the OPUS 6.5 program (Bruker).

X-ray Diffraction (XRD) Measurements and Simulations: In situ powder X-ray diffraction (XRD) was performed on PAnalytical Xpert Pro diffractometer operating with a Cu K$\alpha$ source. The powder sample was placed in an Anton Paar TTK 450 temperature-control chamber. The sample was heat-treated at a desired temperature for 5 hours under a vacuum of 7.5 militorr, and high-resolution diffraction data were then rapidly collected with an X'Celerator detector scanning from 2-30° 2θ with a step size of 0.02°.

X-ray diffraction simulations were performed using the Reflex module of the Materials Studio 3.2 molecular simulation package (Accelrys, Inc.). A polarization factor of 0.5 was used, assuming the sample is in powder form. The instrumental broadening was accounted for by a well-known angle-independent full-width-at-half-maximum (FWHM) expression containing parameters (U, V and W). The values of these three parameters (U=0.6787, V=−0.2563 and W=0.03378), were obtained by fitting the peak shape of the experimental diffraction pattern of LaB6 (NIST) measured on the same instrument.

Atomistically detailed nanotube models with various degrees of hydration were obtained as a product of our recent simulation studies of water adsorption and transport in the aluminosilicate SWNTs. The XRD simulations were carried out with atomistically detailed models of nanotube bundles containing various numbers of nanotubes in different bundling patterns (hexagonal, monoclinic, and orthogonal).

EXAMPLE 2

Results

Figure 2:
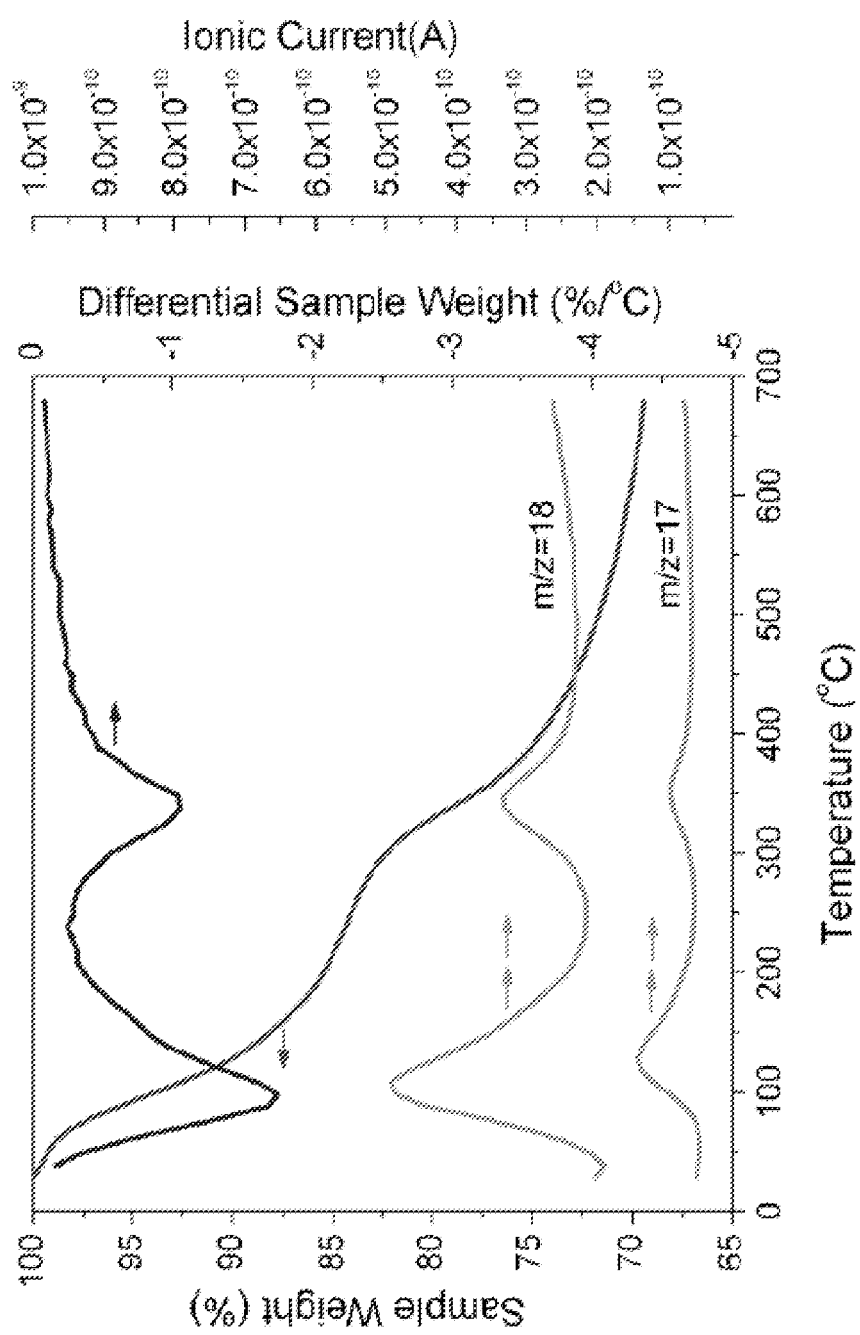
FIG. 2. TGA, differential TGA, and TGA-MS traces. The ratio of ionic current between channels m/z=18 and m/z=17 clearly indicates that both weight losses from SWNT correspond to water molecules leaving the pores.

TGA-MS: We first investigated SWNT dehydration and dehydroxylation phenomena by TGA-MS (FIG. 2). According to the TGA and differential TGA curves, there are two pronounced weight losses at around 100° C. and 350° C. These can be clearly assigned to dehydration and dehydroxylation respectively. Simultaneously, the molecular weight channels 17 (corresponding to OH) and 18 ($H_2O$) in the mass spectrum showed two sets of concurrent peaks. The ratio of the integrated ionic current of channel 17 and 18 is around 0.25. This is a well-known signature of water molecules, and it is therefore clear that water molecules leave the nanotube during the entire measurement (25-700° C.). Furthermore, the trends of both ionic current channels agree with the differential TGA curve. Therefore, we can conclude that the SWNT dehydration is complete by about 250° C., and the subsequent dehydroxylation reaches its maximum rate at about 340° C. Heating takes places for a time ranging from 6 hours to 12 hours, and usually the process is complete before 6 hours.

Figure 3:
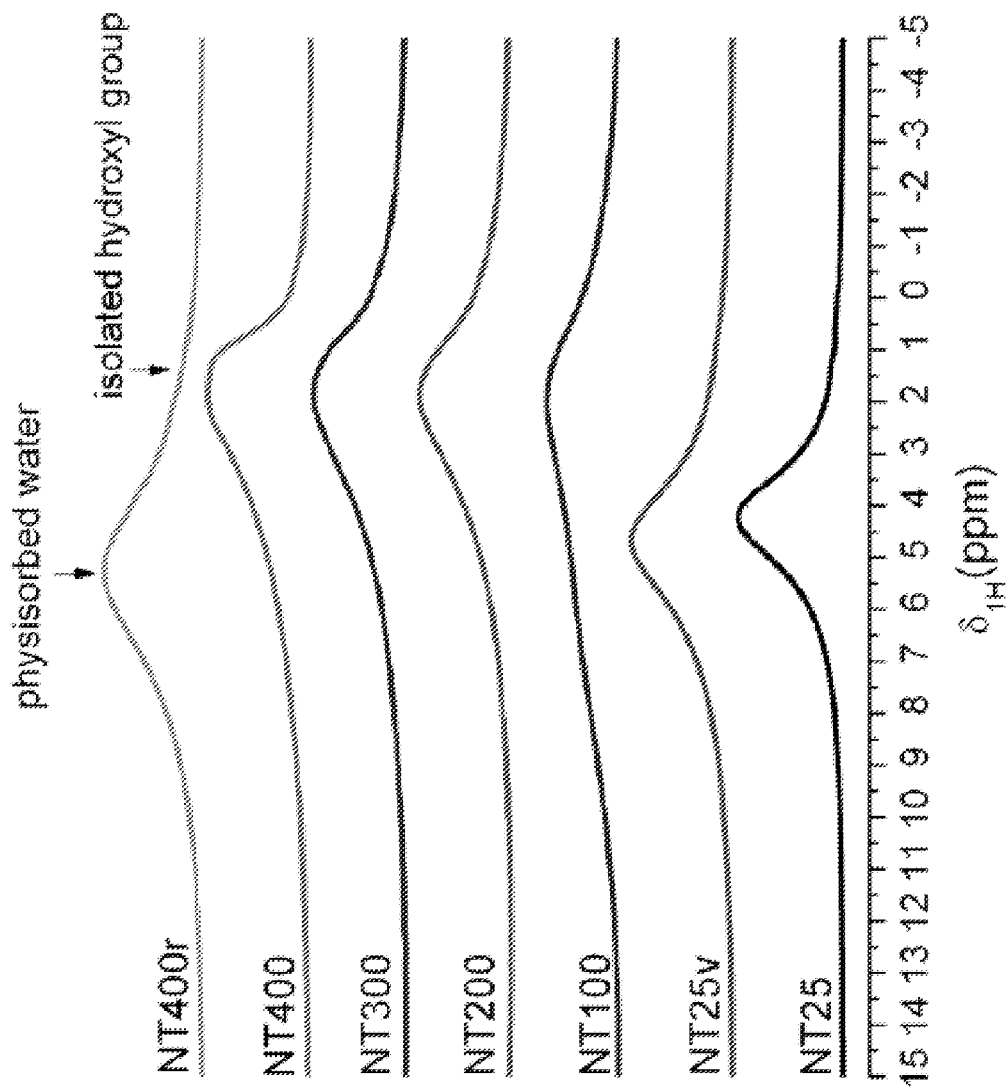
FIG. 3. $^1$H-NMR for the SWNT sample in different pretreated conditions. Sample NT25 is the original SWNT sample, NT25v is the same sample after degassing at room temperature under vacuum, and samples NT100-NT400 represent samples heat treated at the corresponding temperatures (100-400° C.). NT400r represents the rehydrated sample.

Solid-state NMR: $^1H$-NMR is an excellent probe of the hydrogen environment in the SWNTs. Our $^1H$-NMR investigation is summarized in FIG. 3. Sample NT25 is the original SWNT sample, NT25v is the same sample after degassing at room temperature under vacuum, and samples NT100-NT400 represent samples heat-treated at the corresponding temperatures (100-400° C.). NT400r represents the rehydrated sample. Two peaks are observed in the spectra: the peak between 4-6 ppm is assigned to protons from physisorbed water in the pore of the SWNT, whereas the peak at ~1.8 ppm is assigned to the isolated hydroxyl groups.

For samples containing a significant amount of physisorbed water (NT25, NT25v, and NT400r), the NMR signal from water dominates the spectra. On the other hand, for "anhydrous" samples such as NT200, NT300 and NT400, the spectra are dominated by the NMR signal from isolated hydroxyl groups. A clear transition region, wherein the two peaks are of similar magnitude, is observed in the sample NT100.

Figure 4:
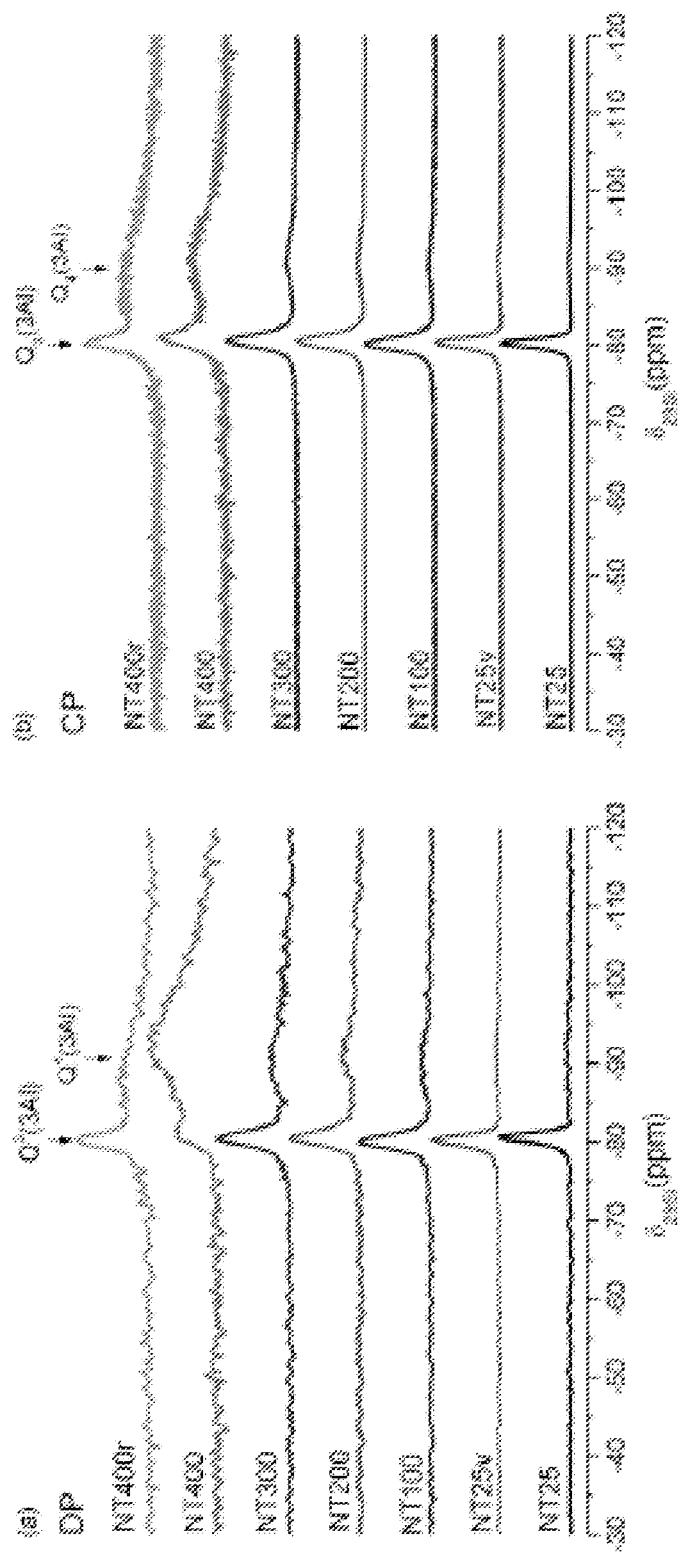
FIG. 4. (a) $^{29}$Si direct-polarized (DP) NMR and (b) $^{29}$Si cross-polarized (CP) NMR for SWNT samples heat-treated at different temperatures.

$^{29}$Si-NMR were then used to provide a molecular-level understanding of the interior wall structure of the SWNT during heat treatment (FIGS. 4a and 4b). In the case of CP-NMR, the signal is enhanced by the presence of protons in proximity to the silicon atoms. In the original SWNT sample (NT25), only one peak located at −79 ppm is seen and is assigned to $Q^3$(3Al). In the heat-treated samples a second, broader peak around −90 ppm is observed, its intensity being relatively insignificant for NT100-NT300 but becoming prominent for NT400.

This peak was rationalized in previous works as a structural transformation from imogolite (SWNT) into a non-tubular material called allophane, based upon the similarity of the NMR spectrum to that of allophane. However, the transformation of tubular imogolite into non-tubular allophane would be expected to involve drastic and irreversible morphological and structural changes in the $^{27}$Al-NMR spectra, vibrational spectra, XRD patterns, and $N_2$ physisorption isotherms. Since such irreversible and drastic changes are not observed (as discussed below), and considering the fact that the inner wall of the imogolite SWNT and the allophone have a very similar silanol structure, it is more appropriate to assign the broad peak at −90 ppm to the condensation of adjacent silanols, thus leading to a transformation of the Si coordination environment from $Q^3$(3Al) into $Q^4$(3Al). The latter is more shielded than $Q^3$(3Al) and is well-known to show an up-field chemical shift. Furthermore, the CP-NMR spectra show a more pronounced $Q^3$(3Al) peak in relation to the $Q^4$(3Al) peak. This is clear due to the enhancement of the former peak by a proximal proton coming from silanol group, whereas this is not possible for the $Q^4$(3Al) signal from fully condensed silanols.

When the SWNT sample is rehydrated (NT400r), a distinct change (in comparison to NT400) occurs. The $Q^3$(3Al) signal dominates the spectrum again, as in the samples NT25-NT300. This is clear evidence of a rehydroxylation phenomenon, wherein most of the condensed $Q^4$(3Al) silicon atoms in NT400 are transformed (by hydrolysis) back into silanols when the anhydrous dehydroxylated sample is re-exposed to moisture. Note that there is no obvious difference between the DP-NMR and CP-NMR spectra for NT400r, since the protons from the hydroxyl group can enhance the $Q^3$(3Al) signal whereas the protons from physisorbed water are able to enhance the $Q^4$(3Al) signal.

Based on the initial chemical composition of the inner wall, we can quantitatively summarize the dehydroxylation and rehydroxylation phenomena of the SWNT interior in the following scheme:

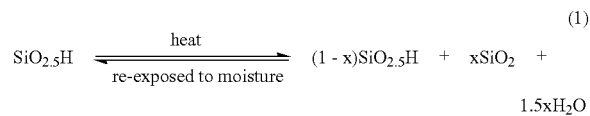

$$SiO_{2.5}H \xrightleftharpoons[\text{re-exposed to moisture}]{\text{heat}} (1-x)SiO_{2.5}H + xSiO_2 + 1.5xH_2O \quad (1)$$

where $0 \le x \le 1$. We obtained the value of x from the ratio of the integrated $Q^3$(3Al) and $Q^4$(3Al) peak areas in DP spectra. The value of x=0.04, 0.20, and 0.73 for NT25, NT300, and NT400 respectively, corresponding to the increasing condensation of silanols upon heat treatment. Upon rehydroxylation to yield sample NT400r, the value of x falls to 0.29.

Figure 5:
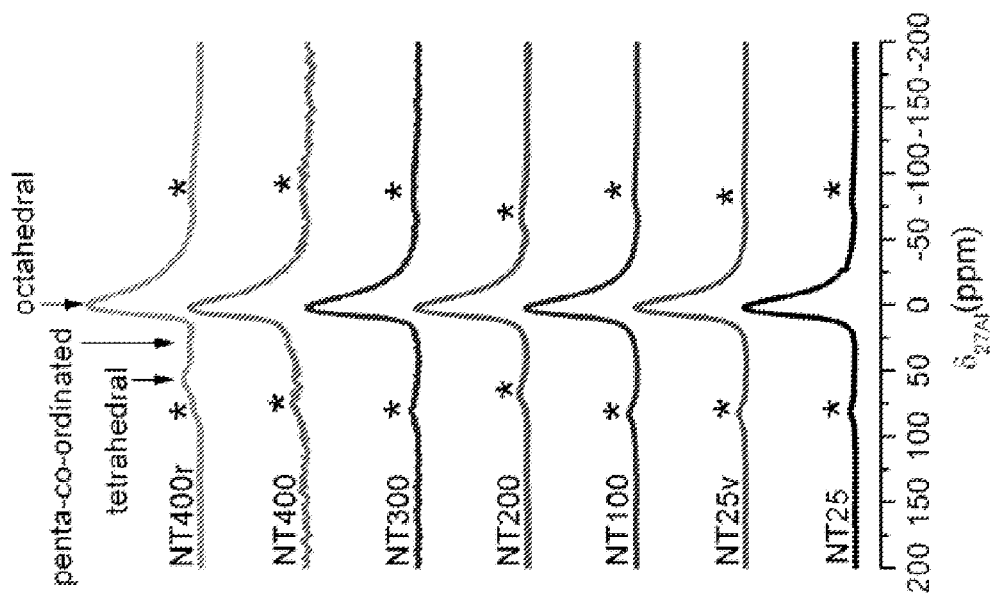
FIG. 5. $^{27}$Al-NMR spectra of SWNT samples heat-treated at different temperatures. Asterisks denote the spinning sideband artifacts.

While $^{29}$Si-NMR elucidates structural changes in the interior of the SWNT, $^{27}$Al-NMR (FIG. 5) gives information on structural changes occurring in the nanotubular gibbsite (aluminum hydroxide) layer comprising its outer surface. The peak at 4 ppm is assigned to the octahedrally coordinated aluminum, which is the only type of aluminum present in the purified original SWNT material (NT25). The spectra remain unchanged until NT400, wherein a broad shoulder is observed.

When the anhydrous dehydroxylated SWNT sample is rehydroxylated (NT400r), the shoulder further resolves into clear peaks at 30 ppm and 60 ppm. The 30-ppm peak is clearly assigned to penta-coordinated aluminum, and the peak at 60 ppm to tetrahedral aluminum.

Note that in the absence of comprehensive evidence (as presented here), it is possible to attribute the changes in the $^{27}$Al-NMR spectra to an imogolite→allophane transformation (since imogolite contains only octahedral aluminum whereas allophane also contains non-octahedral aluminum). However, our detailed study shows that it is more appropriate to attribute them to local changes in the structure of the SWNT due to (reversible) condensation of a fraction of the silanol groups and a concomitant (irreversible) decrease in the coordination environment of a fraction of the aluminum atoms. Based upon the $^{27}$Al-NMR spectra, we are able to propose a model for the (irreversible) SWNT dehydroxylation at the outer surface:

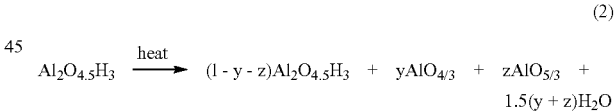

$$Al_2O_{4.5}H_3 \xrightarrow{\text{heat}} (1-y-z)Al_2O_{4.5}H_3 + yAlO_{4/3} + zAlO_{5/3} + 1.5(y+z)H_2O \quad (2)$$

where $0 \le (y,z) \le 1$, and $AlO_{4/3}$ and $AlO_{5/3}$ represent tetrahedral and penta-coordinated aluminum respectively. We performed a quantitative analysis for the values of y and z in a manner similar to our analysis of the $^{29}$Si-NMR spectra. For example, we obtained (y,z)=(0,0) and (0.06, 0.14) for NT25 and NT400 respectively, reflecting the conversion of octahedral aluminum during heat treatment. On the other hand, the rehydroxylated sample NT400r gives (y,z)=(0.09, 0.06). The decrease in the fraction of total non-octahedral aluminum (y+z) upon rehydroxylation indicates the partial hydration of the tetrahedral and penta-coordinated aluminum into octahedral aluminum.

However, it should be cautioned that the quantitative interpretation of $^{27}$Al-NMR spectra is less reliable than that of $^{29}$Si-NMR spectra. For example, differences in coordination environment and hydration level may also affect the intensity of $^{27}$Al signals due to its quadrupole moment, and thus may contribute to the better resolution of the NMR signals from penta-coordinated and tetrahedral aluminum in sample NT400r as compared to NT400.

Figure 6:
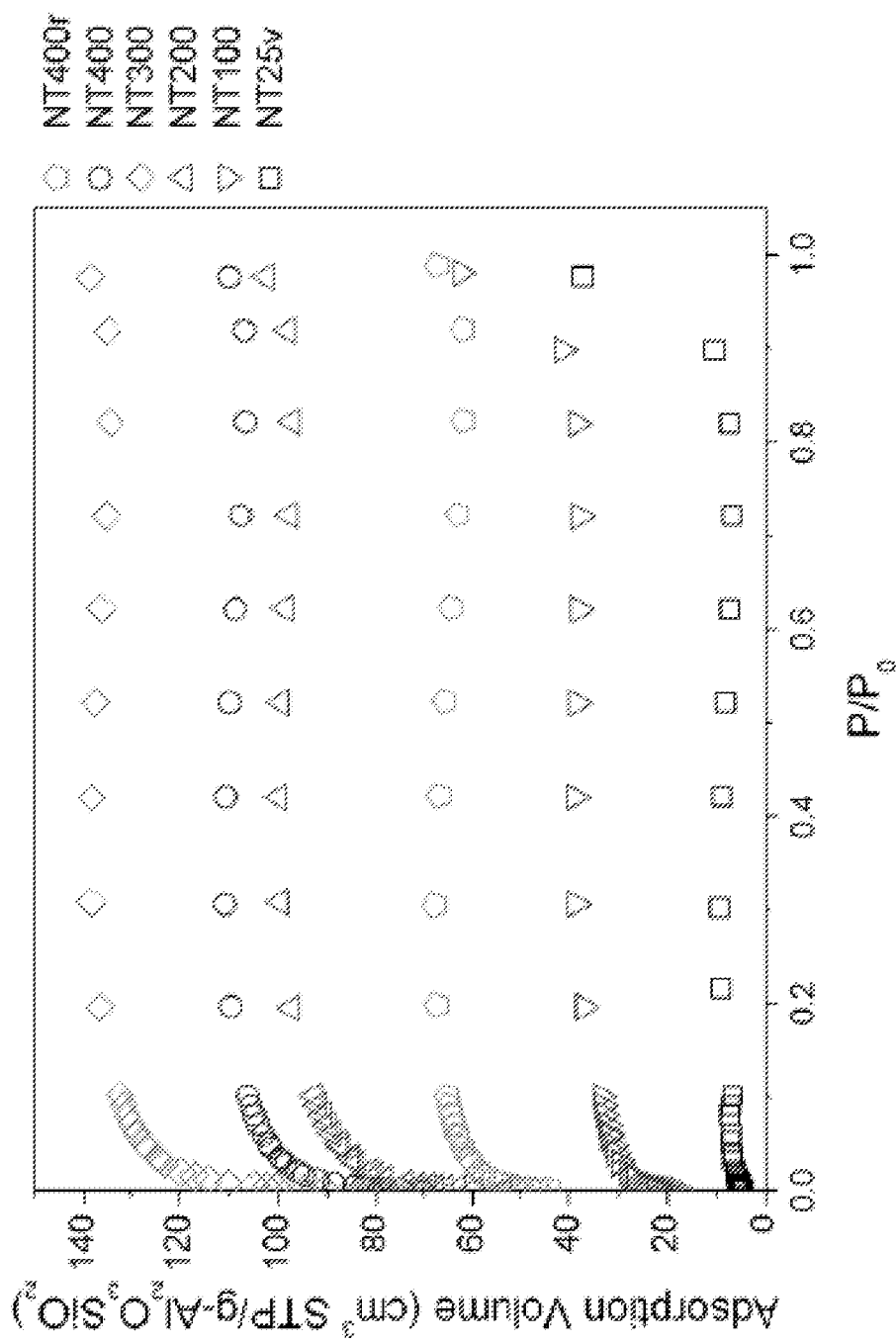
FIG. 6. $N_2$ physisorption isotherms of SWNT samples prepared by different heat-treatment conditions. The nominal value of free volume (which is taken as equal to the sample tube volume) did not exactly match the actual free volume, leading to a slight dip in the isotherms at moderate pressures ($P/P_0$=0.2–0.8).

Nitrogen Physisorption: $N_2$ physisorption measurements for SWNT samples heat-treated at different temperatures were performed to investigate how dehydration, dehydroxylation, and structural transformation affects the SWNT pore volume (FIG. 6). The original SWNT sample (NT25) did not show a significant pore volume, due to occupation of the pores by physisorbed water. The physisorption isotherms from the SWNT sample degassed at ambient conditions (NT25v) and heat-treated at 100° C. (NT100) show characteristics of an IUPAC Type II isotherm, which indicates non-porosity due to pore blocking by physisorbed water.

In contrast, as the SWNT samples become more dehydrated (NT200 and NT300), the shape of the isotherm transforms to an IUPAC Type I, distinctly suggesting activation of the porosity of the SWNT interior. The monotonic increase in the pore volume from NT25 to NT200 is due to SWNT dehydration, and from NT200 to NT 300 by dehydroxylation, in qualitative agreement with TGA-MS (Section 3.1) and FT-IR (Section 3.4) studies. However, a pore volume decrease is observed as the heat treatment temperature goes from 300° C. to 400° C.

This phenomenon could be rationalized by partial pore blocking caused by the structural transformations accompanying dehydroxylation. Even though the wall structure of NT400 is likely to be partially "damaged" or disordered, the isotherm still shows a high microporosity. The further drop in pore volume for NT400r, in comparison to NT400, is presumably due to the decrease in pore volume due to the reconstitution of a substantial number of silanol groups, as well as the reoccupation of the SWNT pores with some amount of strongly physisorbed water.

FT-IR: The IR absorbance spectra of samples heat-treated and degassed at different temperatures are summarized in FIG. 7a. The absorption at 1630 $cm^{-1}$ is well known to represent the scissoring mode of physisorbed water. The rather broad absorption in the 2800-3800 $cm^{-1}$ region is due to various stretching vibrations of O—H groups in the material: silanols at the inner surface, bridging Al—(OH)—Al groups at the outer surface, physisorbed water, and hydrogen bonding interactions between these species. Due to the intrinsically limited resolution of solid-state IR spectra, an assignment of the roles of these individual vibrational species is not possible. However, since all IR spectra were collected in situ on the same sample, a quantitative estimate of the amount of water and hydroxyl groups can be made on the basis of the integrated areas under the two respective absorbance peaks.

Figure 7:
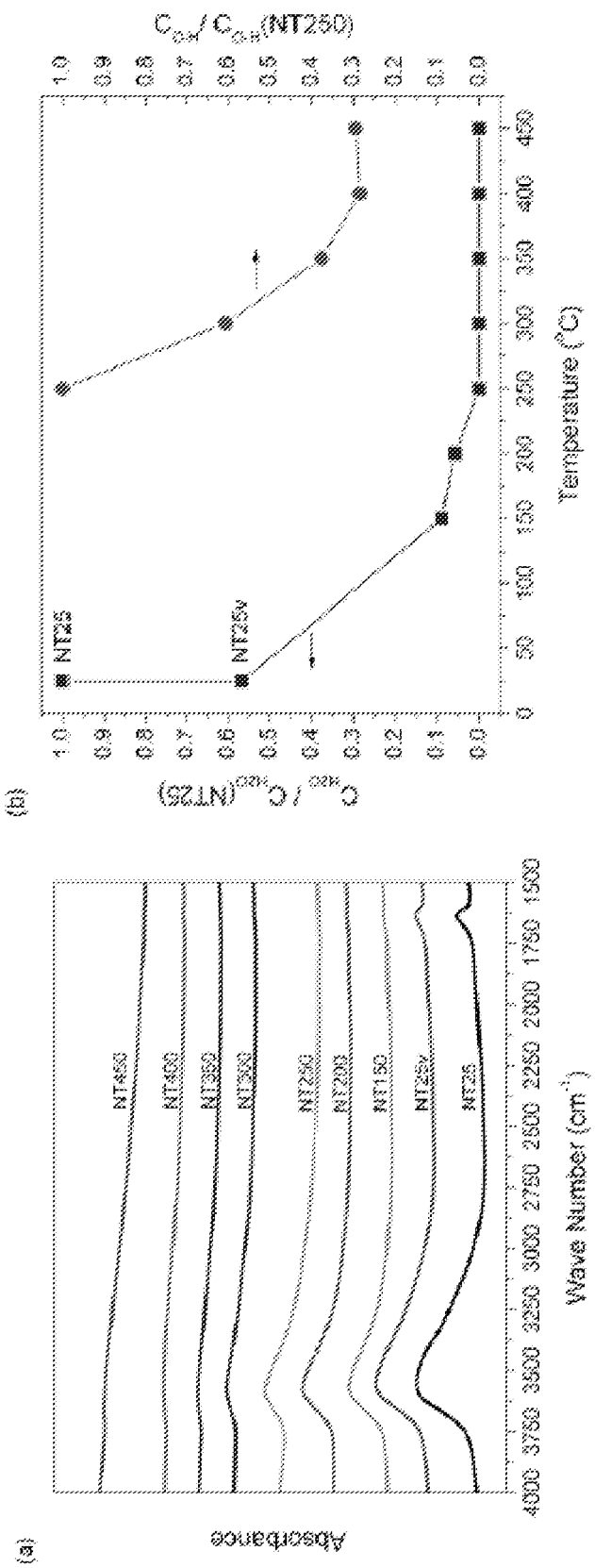
FIG. 7. (a) FTIR spectra of heat-treated SWNT samples. All spectra are plotted to scale and stacked in a vertical series. (b) Normalized physisorbed water concentration, and normalized hydroxyl group concentration, in the SWNT at different heat-treatment temperatures as calculated from FT-IR spectra.

FIG. 7b shows the concentration of physisorbed water in the different samples, normalized by the water concentration in the SWNT sample at ambient conditions (NT25). This result confirms that the vast majority (~90%) of the physisorbed water is removed by vacuum heat treatment up to 150° C., and that the SWNT sample is completely dehydrated by 250° C. The hydroxyl concentration in samples NT250-NT450, normalized by the hydroxyl concentration of the "baseline" dehydrated sample (NT250), is also shown in FIG. 7b. It is suggested that around 30% of the hydroxyl groups (~2.7 —OH/$nm^2$) survive at 450° C.

Figure 8:
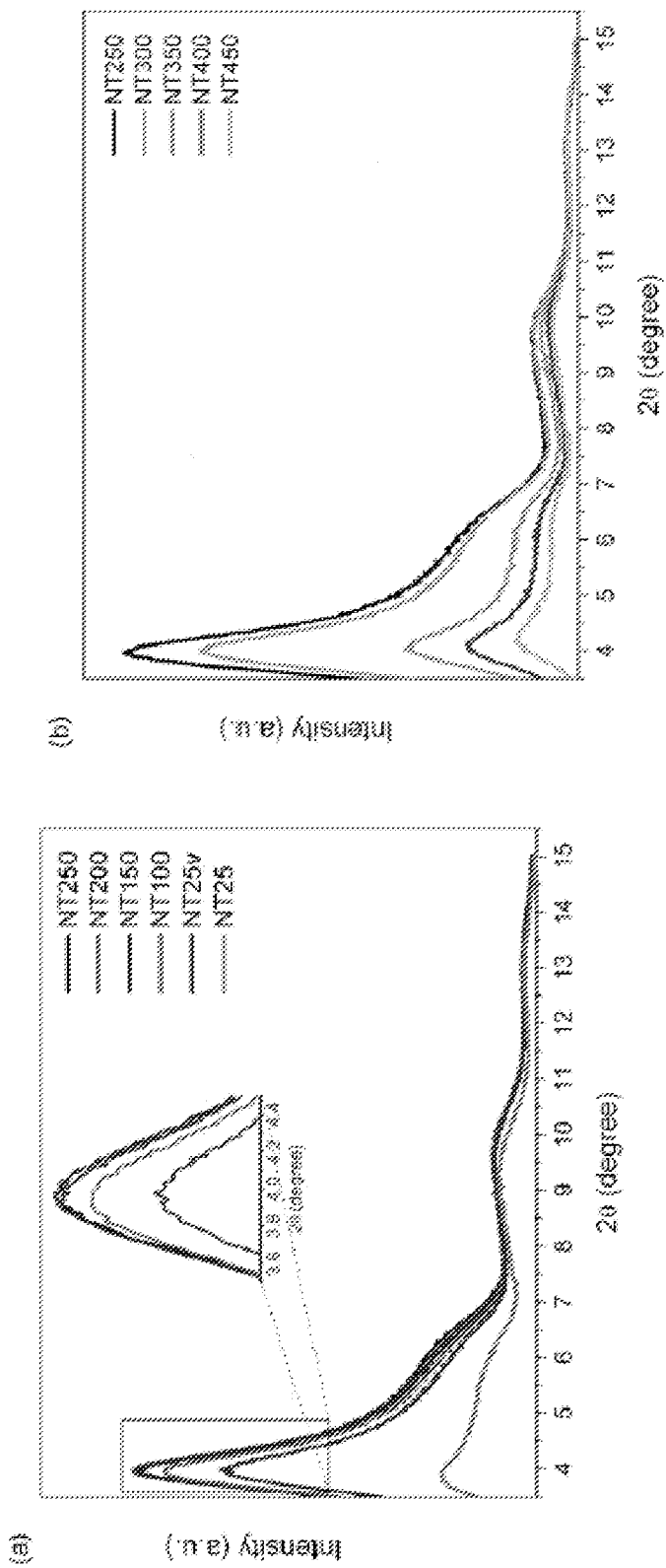
FIG. 8. In situ XRD patterns of the SWNT sample: (a) from room temperature to 250° C., and (b) from 250-450° C. All patterns are plotted to scale.

XRD Measurements and Simulations: To complete our study of the SWNT structure during dehydration and dehydroxylation, and to investigate the packing of the SWNTs in the solid sample, we performed in situ XRD measurements on SWNT samples heat-treated at various temperatures. Our experimental results (FIGS. 8a and 8b) show a substantial intensity increase of the first peak at 3.9 degrees 2θ upon dehydration from NT25 to NT250. On the other hand, the fourth peak at 13.3 degrees 2θ remains constant in intensity. Beyond a heat treatment temperature of 250° C., there is a monotonic decrease in the intensity of the first peak.

A detailed XRD simulation study was performed in order to extract reliable structural information and explain the observed phenomena. In a previous work, we qualitatively interpreted the XRD patterns of SWNT film samples in terms of Bragg diffraction from a crystalline bundle of nanotubes. Several later studies investigated the XRD patterns more quantitatively. In particular, a more accurate model of the XRD patterns can be obtained by considering diffraction from small SWNT bundles (each composed of only a few nanotubes). However, a good agreement between experimental and simulated XRD patterns could not be achieved due to the effects of a number of parameters such as the number of SWNTs in a single bundle, number of gibbsite structural units in the SWNT circumference, inter-nanotube distance, degree of hydration, etc.

Figures 9A, 9B:
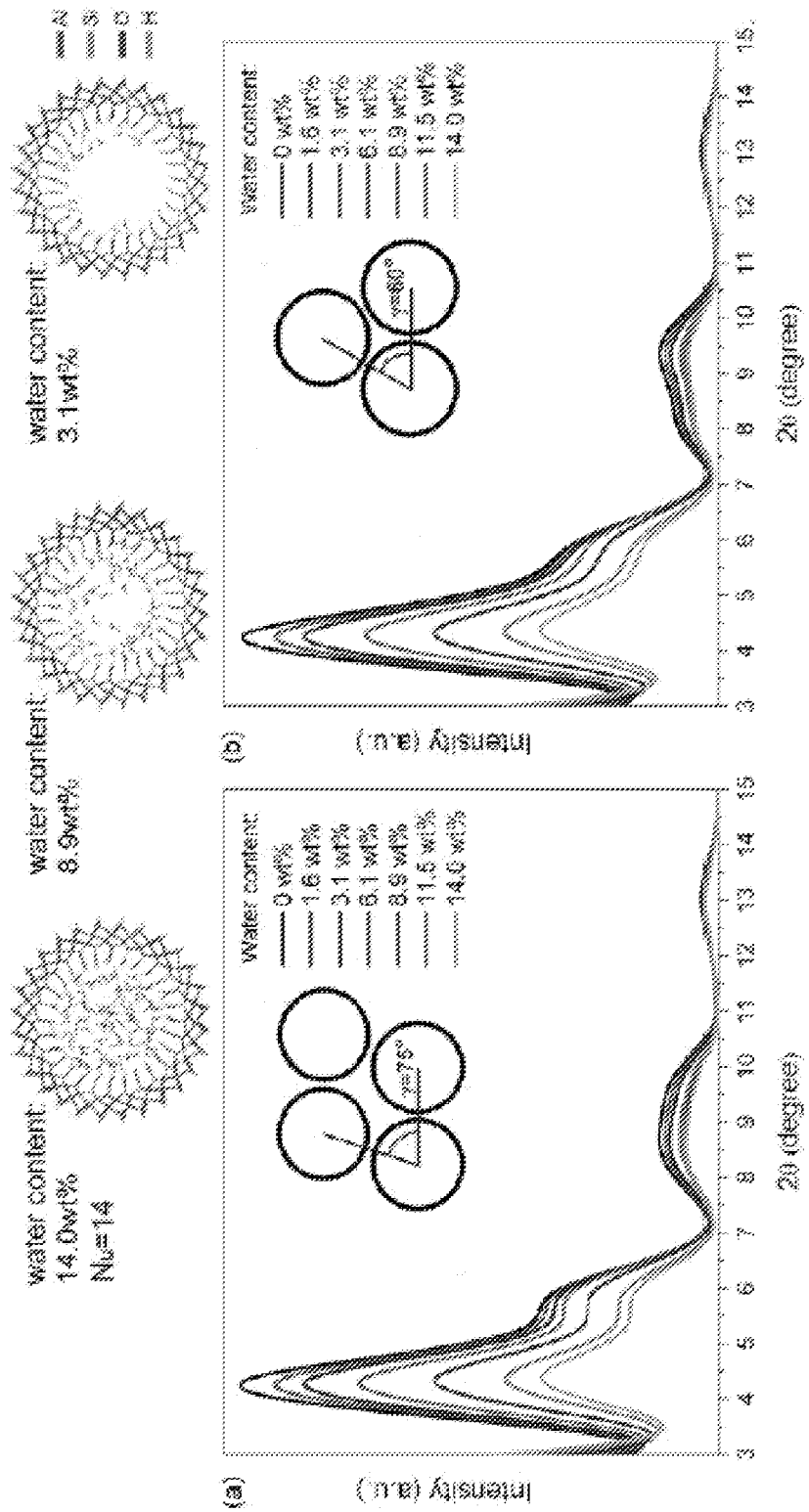
FIG. 9. (a) Simulated XRD patterns of the SWNT sample with different diameters, bundle structures, and water contents: (a) Nu=1 4, 2×2 bundling; (b) Nu=14, triangular bundling; (c) Nu=12, 2×2 bundling; and (d) Nu=12, triangular bundling. Examples of the SWNT-water models obtained by Grand Canonical Monte Carlo (GCMC) simulations are also shown.
Figures 9C, 9D:
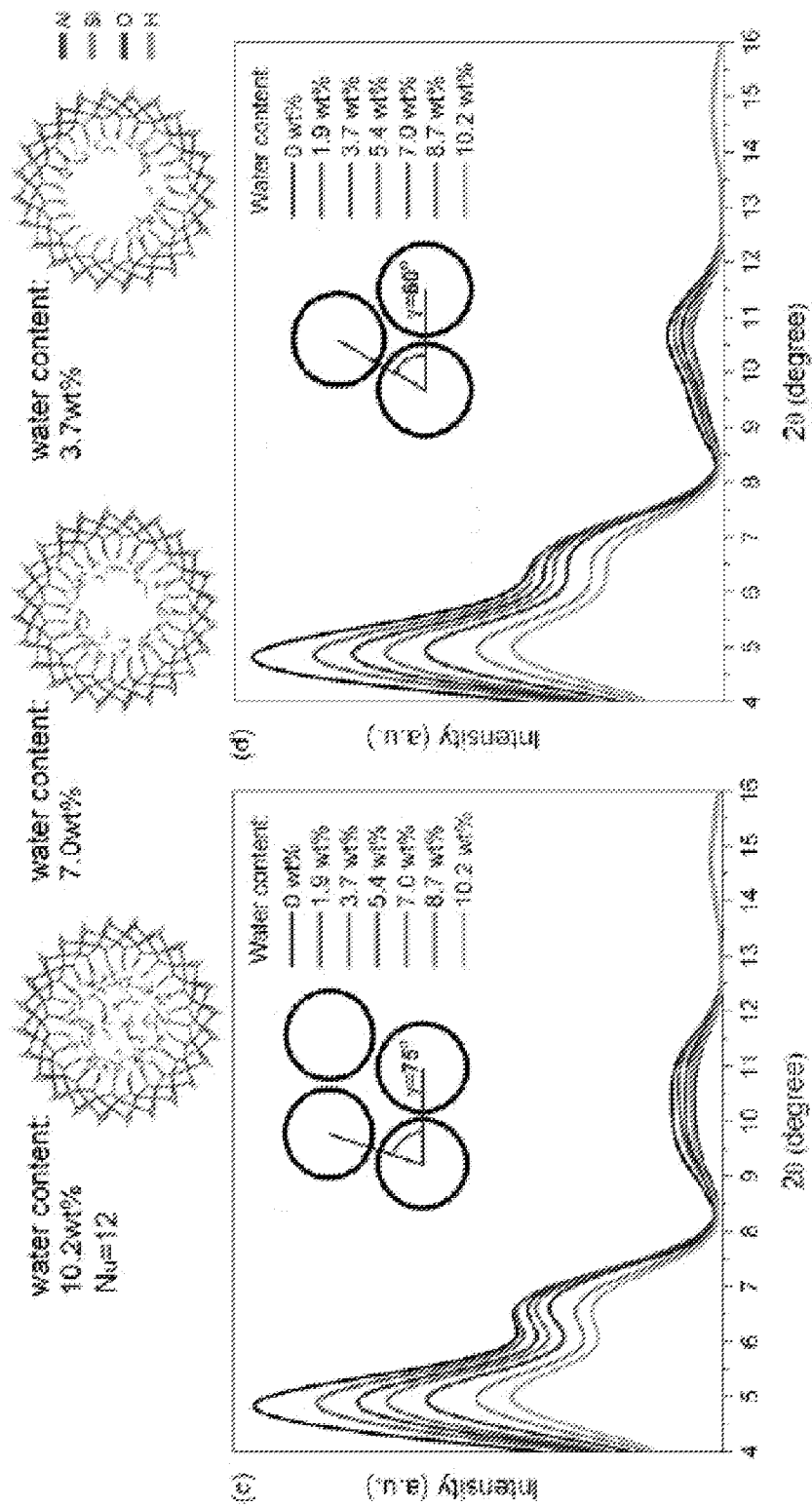

We, therefore, performed a systematic XRD simulation study on both dehydrated and hydrated SWNTs to achieve the best fit of the simulated XRD packing angle of 60°. Although a hexagonal packing is intuitively assumed in many studies, a monoclinic packing angle of ~78° has also been proposed previously based on circular dichroism and XRD measurements. Another important parameter is the number of replicating gibbsite units (Nu) in the SWNT circumference. Several recent computational studies employing quantum chemistry or classical forcefield techniques, suggest that the thermodynamically favored value of Nu=12. However, the XRD simulations show that models with Nu=14 agree somewhat better with experimental data. It is not possible to conclusively identify the exact value of Nu based upon the XRD patterns. Hence, in FIG. 9 we depict simulation results for both values of Nu and for both the "best fit" packing models.

Figure 10:
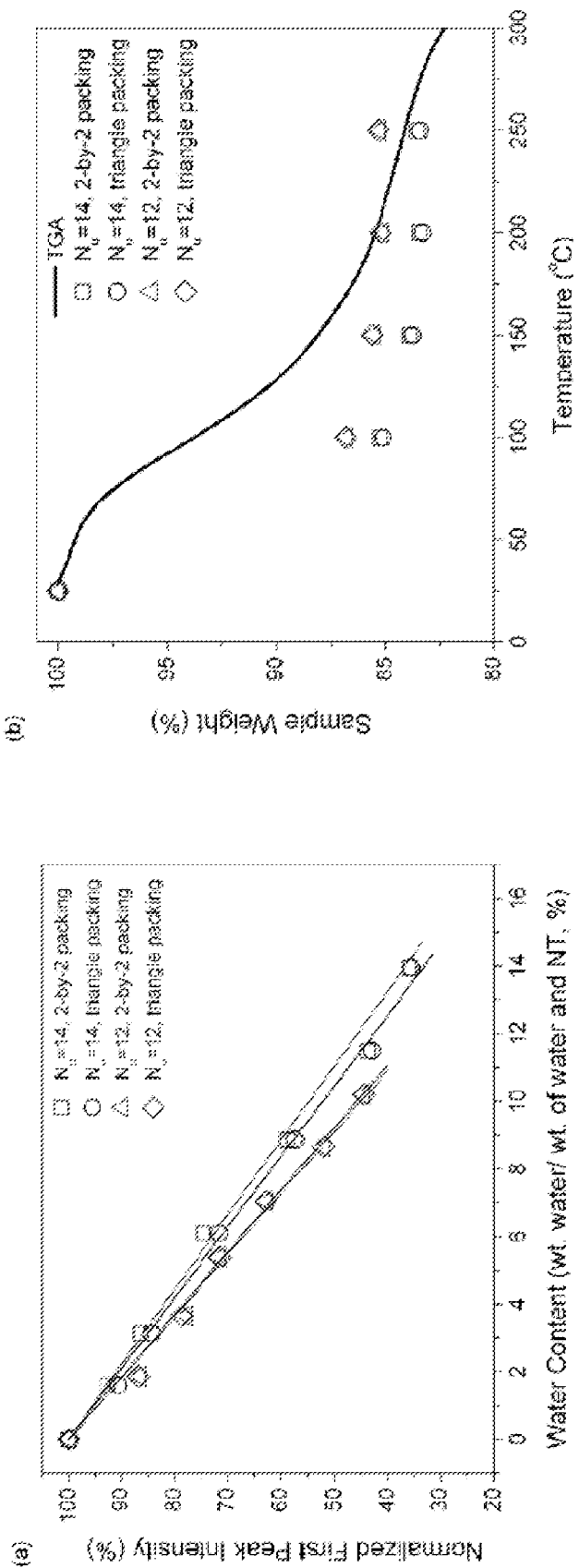
FIG. 10. (a) Correlations of the first low-angle peak from simulated XRD patterns versus the weight fraction of water for four sets of simulation parameters. (b) SWNT sample weight loss calculated from experimental in situ XRD patterns and the correlation function derived in (a). The TGA trace is also included for comparison.

In all four cases, the intensity of the first peak strongly correlates with the amount of physisorbed water whereas the intensity of the fourth peak stays constant. Thus, the effect of hydration on the XRD patterns of the present SWNTs is analogous to the effect of $C_{60}$ buckyballs in the pores of carbon nanotubes (i.e., "pea-pod" structures) on the XRD patterns of carbon nanotube bundles. Therefore, we can quantitatively correlate the integrated intensity of the first peak (as obtained from the simulated XRD patterns) with the water content (FIG. 10a). Strongly linear correlations are derived for all the four SWNT packing models. With these correlations, we can calculate the water content of the SWNTs from the experimental XRD data (FIG. 10b). The results indicate that there is ~15 wt % water physisorbed in the SWNT in ambient conditions.

This is in good agreement with the thermogravimetric analysis (TGA) results (shown in FIG. 10b), as well as with prior Monte Carlo simulation results. However, the shape of the TGA curve cannot be directly compared to the XRD results owing to the different conditions of these experiments. The former is a dynamic water loss measurement carried out under flowing helium, whereas the XRD patterns are from samples equilibrated under vacuum.

The phenomenology and mechanisms of dehydration and dehydroxylation in single-walled aluminosilicate nanotubes have been evaluated comprehensively in this study. A quantitative dehydration investigation via FTIR, TGA and XRD, suggests the SWNT sample contains about 15% physisorbed water under ambient conditions and becomes completely dehydrated at 250° C. Dehydroxylation, which (reversibly) transforms $Q^3$(3Al) silicons into $Q^4$(3Al) and (irreversibly) transforms octahedral aluminum into penta-coordinated and tetrahedral aluminum, takes place beyond 250° C. as elucidated by NMR spectroscopy. A quantitative model for these processes was deduced from our investigation. A unique rehydroxylation phenomenon, which transforms condensed $Q^3(3Al)$ silicons back into $Q^4(3Al)$ silicons upon re-exposure to water vapor, has been discovered by $^{29}$Si-NMR and $N_2$ physisorption. Furthermore, $N_2$ physisorption and XRD show that dehydration and initial dehydroxylation lead to a high microporosity of the nanotubes, whereas dehydroxylation at 400° C. or higher leads to partial pore collapse. The SWNT reaches its maximum pore volume (~1.4 times that of the anhydrous SWNT obtained at 250° C.) at 300° C., at which temperature about 40% dehydroxylation has also occurred and an inner-surface silanol concentration of 5.5 —OH/nm$^2$ exists. Hence, we conclude that heat treatment under vacuum at 250-300° C. is an optimal pre-treatment condition before surface modification of the SWNT under anhydrous conditions.

Finally, we show that the XRD patterns of the SWNTs at various degrees of dehydration can be quantitatively modeled and matched to experimental data. Our investigation yielded four most likely models for SWNT packing and number of gibbsite units (Nu) among the many possibilities, as well as provided a quantitative correlation between the water content and X-ray scattering intensity from the SWNT. These four possibilities will enable a more detailed investigation to ascertain the unique packing model and the exact number of gibbsite units in the SWNT circumference.

EXAMPLE 3

Functionalized SWNT

Once water molecules have been removed from inner surface of a SWNT, it will become possible to functionalize (or derivatize) the inner surface by reacting various groups with the SWNT under anhydrous conditions. For example, metals can be added to the inner surface in non-aqueous solvents. In particular, the addition of metal catalysts to the inner surface can be beneficial. Such catalysts include, but are not limited to transition metals such as Sc, Ti, V, Cr, Mn, Fe, Co, Ni, Cu, Zn, Y, Zr, Nb, Mo, Tc, Ru, Rh, Pd, Ag, Cd, Os, Ir, Pt and the like. Other modifications include the addition of halides, fluorescent reporter molecules, biological reporter molecules, small molecule drugs, dopants, carboxylation, addition of sulphate or nitrates, passivation, alkylation, arylation, and the like.

It will also be possible to differentially modify the inner and outer surfaces of a SWNT by first modifying the outer surface under aqueous conditions, wherein water molecules inside the SWNT will prevent significant reaction of the inner surfaces, followed by dehydration as described herein, and then reaction of the inner surface under anhydrous conditions.

Interior Modification of Aluminosilicate SWNT: For SWNT interior modification, 500 mg of as-synthesized SWNT powder was first placed in a flask connected to a 15-millitorr vacuum line and heat treated at 250° C. for 24 hours, after which it was considered fully dehydrated based upon our previous study. The heat-treated SWNT sample was then transferred to a nitrogen glove box and about 5 mL of hexane solvent was added into the flask. The functionalizing reagent (acetyl chloride, trimethylmethoxysilane, or trichlorosilane) was then transferred into the flask, with the reagent to SWNT hydroxyl group molar ratio being about 2. The mixture was allowed to stir under nitrogen for 24 hours. The flask was then connected to the vacuum line and treated at 180° C. for 24 hours to remove the solvent and unreacted reagent. The resulting powder samples were used for characterization studies. The label "NT" denotes the bare SWNT, whereas "NT-A", "NT-M", and "NT-T" denote the SWNT treated by acetyl chloride, methyltrimethoxysilane, and trichlorosilane, respectively.

Solid-State NMR: The SWNT sample was first packed into a 7-mm rotor. $^{13}$C, $^{27}$Al and $^{29}$Si MAS NMR experiments were carried out on a Bruker DSX 300 spectrometer at frequencies of 75.5, 78.1 and 59.6 MHz. For $^{13}$C cross-polarization (CP) MAS NMR studies, the sample was spun at 5 kHz, and a single pulse of π/2 and repetition time of 4 s was used. The sample was spun at 5-6 kHz for $^{27}$Al MAS NMR tests, for which a single pulse of π/6 and a repetition time of 0.1 s was used. For $^{29}$Si MAS NMR, direct-polarization (DP) and cross-polarization (CP) tests were performed with repetition times of 10 seconds and 5 seconds, respectively, at π/2 single pulse and 5-kHz spinning rate. The chemical shifts of $^{13}$C, $^{27}$Al, and $^{29}$Si were referenced to adamantane, aluminum trichloride, and 3-(trimethylsilyl)-1-propanesulfonic acid sodium salt, respectively.

X-ray Diffraction (XRD): Powder X-ray diffraction (XRD) was performed on a PAnalytical X'pert Pro diffractometer operating with a Cu Kα source. The high-resolution diffraction data were collected with a diffracted-beam collimator and a proportional detector, scanning from 2 to 30° two theta with a step size of 0.05°.

Thermogravimetric Analysis (TGA): The experiment was performed with a Netzsch STA409 instrument. Approximately 20 mg powder sample was heated under nitrogen diluted air from 25 to 900° C. with a ramp rate of 10° C./min.

Nitrogen Physisorption: Nitrogen physisorption measurements were carried out on a Micromeritics Tristar II at 77 K. The sample was placed in an analysis tube and degassed under 15 mTorr at 200° C. for 12 hours before the physisorption measurement.

Water Adsorption: Water adsorption measurements were performed on IGAsorp (Hiden Analytical, Warrington, UK) at 25° C. The sample was outgassed at 200° C. for 8 hours prior to recording the isotherm.

Transmission Electron Microscopy (TEM): Approximately 5 mg of SWNT samples were first dispersed in 10 mL deionized water. The resulting dispersion was sonicated for 10 minutes. Around 5 drops of the sonicated SWNT dispersion were added on 300-mesh copper grids coated with Formvar layers. Transmission electron microscopy (TEM) images were recorded on a Hitachi HF2000 field emission gun TEM operated at 200 kV.

While XRD reveals the nanotube structure and high bulk purity of the bare and modified SWNTs, TEM images provide localized visual information on the samples and confirms the XRD results. The TEM image from the as-synthesized SWNT sample (FIG. 13, NT) clearly shows bundles of aligned nanotubes with an about 2-nm line-to-line distance representing the outer diameter of SWNT. After treatment with the organic reagents, the channels of the modified SWNT samples remain intact as shown in FIG. 13, NT-A, NT-M and NT-T. Although the SWNTs form dense bundles on the TEM grid after evaporation of the solvent, one can also occasionally observe isolated nanotubes (as seen in FIG. 13, NT-T).

Porosity, structure, and organic loading: The nitrogen physisorption isotherms (not shown) of the as-made and the three modified SWNT samples all show the characteristics of IUPAC type I isotherms, suggesting that the pore channels of the modified SWNT samples are microporous, as expected. More detailed information can then be extracted by employing the BET model and t-plot method to these isotherm data. The BET model yields the total surface area ($S_{BET}$), contributed by both interior and outer surfaces of the SWNT. On the other hand, the t-plot method is well known for differentiating mesoporosity from microporosity present in the same sample.

Specifically, the linear fitting of the isotherms with H-J correlations allows us to estimate the external surface area ($S_{ext}$) contributed by the outer surface of SWNT, and the micropore volume ($V_{mp}$) due to the pore volume in the SWNT channels. Our results indicated that for the as-synthesized SWNT, $S_{BET}$ is about 42 times larger than $S_{ext}$, suggesting there is significantly larger "accessible" surface area at the interior of SWNT in comparison to the outer surface. The relatively small accessible external surface area of SWNT is likely due to the packing of single SWNTs into bundles. After treatment with the three different reagents, all the samples showed substantial decreases in both $V_{mp}$ and the "internal" surface area $S_{BET}$–$S_{ext}$, thereby providing direct evidence that most of the surface modification reaction takes place at the interior of the SWNTs and that the introduced organic entities are immobilized in the SWNT channels. However, the amount of decrease in $S_{BET}$–$S_{ext}$ and $V_{mp}$ for the three modified SWNT samples is strongly related to the molecular size of the reagent and the fractional silanol substitution at the SWNT's inner surface (which can also be considered the loading of the reagent).

A deviation of $S_{ext}$ from bare to modified SWNTs was also observed, due to the variation in SWNT bundling characteristics between samples. In particular, the $S_{ext}$ for as-synthesized SWNT from five batches showed an average of 12.2 with a standard deviation of 4.5 $m^2/g$-$Al_2O_3SiO_2$. On the other hand, $V_{mp}$ and $S_{BET}$ of the as-made SWNT from five batches show averages of 0.168 $cm^3/g$-$Al_2O_3SiO_2$ and 417 $m^2/g$-$Al_2O_3SiO_2$ with relatively small standard deviations of 0.008 $cm^3/g$-$Al_2O_3SiO_2$ and 18 $m^2/g$-$Al_2O_3SiO_2$, respectively. Hence, the differences of $S_{ext}$ between bare and modified SWNTs was within the statistical variation, whereas the deviations of $V_{mp}$ and $S_{BET}$–$S_{ext}$ from bare to modified SWNTs were statistically meaningful. As a consequence, the analysis from nitrogen physisorption measurements revealed that the modified SWNT samples possess significantly lower pore volumes and total surface areas (dominated by the inner surface area of nanotubular channels) than the bare SWNTs, whereas no statistically significant deviation in the external surface areas was observed, hence clearly suggesting that the surface modification takes place in the interior of the SWNT.

While nitrogen physisorption analysis elucidated the porosity and surface area of the as-made and modified SWNTs, X-ray diffraction (not shown) gave information on the morphology and bundling of the SWNTs. Our previous XRD simulation study suggested that the characteristic powder diffraction pattern of as-synthesized SWNTs is due to two probable bundling units—either a 2×2 bundle with a packing angle of 75° or a triangular arrangement with a packing angle of 60°. The three modified SWNT samples show XRD patterns nearly identical to that of the bare SWNT (not shown). The nanotubular structure, as well as the SWNT bundling characteristics, remain unchanged after the surface modification.

Thermogravimetric analysis was employed to investigate the mass losses associated with heating the SWNTs in diluted air, including losses associated with physisorbed water, surface hydroxyl groups, and grafted organic groups. For the bare SWNT, two pronounced peaks, one ranging from 25-250° C. and the other from 250-450° C., were observed. They were assigned to the loss of physisorbed water and hydroxyl groups respectively. An additional peak in the 450-600° C. region was observed in all three modified SWNTs, and was assigned to the loss of the introduced organic entities.

Furthermore, considering the low boiling points of the reagents used (52° C. for acetyl chloride, 102° C. for methyltrimethoxysilane, and 32° C. for trichlorosilane), the relatively high temperature (450-600° C.) at which the organic groups were lost implies that they were covalently bonded to the inner surface, and not merely physisorbed on the inner surfaces of the SWNTs.

The mass loadings of physisorbed water, hydroxyl groups, and organic groups in the bare and modified SWNTs, all normalized by the mass of dry aluminosilicate ($Al_2O_3SiO_2$) at the end of TGA measurement (900° C.), are shown in Table 2. For the three modified SWNT samples, decreases of the physisorbed water loading in comparison to the as-made SWNT suggest that all the surface modifications yield a lower hydrophilicity in the SWNT. Apart from the decrease of physisorbed water loading, a decrease of the hydroxyl group loading accompanying the organic group loading was also observed in the three modified samples. This clearly shows that the surface silanols in SWNT were partially substituted by the surface modification reagents.

Surface Reaction Schemes: Based upon the results reported above, it is likely that the reagents (acetyl chloride, methyltrimethoxysilane, and trichlorosilane) reacted with surface silanols in the SWNT interior and are, therefore, immobilized on the surface. Therefore, we propose reaction schemes for the treatment of the SWNT with different reagents (Scheme 1 in FIG. 12A, see also FIG. 12B) in analogy to the reported surface modifications of silicate materials by acid halides, methoxysilanes, and chlorosilanes, respectively. Our schemes are consistent with observed data when assessed by $^{29}Si$ and $^{13}C$ solid-state NMR (not shown).

Water adsorption: After surface modification by the three reagents, the water uptake capacity of the SWNTs decreased substantially to about 60-75% of the bare SWNT capacity, suggesting that the modified samples become more hydrophobic. However, a decrease of water capacity in the modified SWNT can be also be partly rationalized by a lower pore volume (verified by nitrogen physisorption) as well as the variation of surface hydrophilicity after modifications.

A mechanistic model is necessary to gain physical insight on the water adsorption isotherms in SWNTs. Based upon Grand Canonical Monte Carlo (GCMC) simulation results (not shown) of water adsorption in bare SWNT (carried out in a manner identical to our previous study), it is clear that the water molecules can form multiple layers inside the SWNT, beginning from a monolayer at low chemical potential.

Based on our previous work, it was clear that the first layer of water molecules is primarily formed by hydrogen bonding between water molecules and surface silanol groups, whereas the subsequently adsorbed water layers form by hydrogen bonding between water molecules. Therefore, we propose a model for water adsorption in modified SWNTs. The proposed mechanism includes two phenomena: (1) in the formation of the first adsorbed water layer, with the water molecules only hydrogen-bonding on the sites at which the surface silanols have not been substituted by organic groups; and (2) a subsequent water layer forms adjacent to the first water layer by hydrogen bonding between two adjacent water molecules.

The BET model, which captures multi-layer adsorption phenomena, can be used to model the water adsorption mechanism in the SWNT:

$$\frac{P/P_0}{n(1-P/P_0)} = \frac{(C-1)}{n_m C}(P/P_0) + \frac{1}{n_m C} \quad (1)$$

where P is the pressure of water vapor, $P_0$ is the saturated water vapor pressure at a given temperature, n is the adsorption quantity (g-water/g-$Al_2O_3SiO_2$), $n_m$ is the monolayer coverage (g-water/g-$Al_2O_3SiO_2$), and C is the ratio of the equilibrium constants for the monolayer and subsequent multilayer adsorption. Usually, the constant C is of several orders of magnitude larger than unity for $N_2$ adsorption at 77 K as well as in our water adsorption fitting results. Hence equation (1) can be simplified to:

$$\frac{P/P_0}{n(1-P/P_0)} = \frac{1}{n_m}(P/P_0) + \frac{1}{n_m C} \quad (2)$$

Based on Equation (2), a plot of $$\frac{P/P_0}{n(1-P/P_0)} \text{ vs. } (P/P_0)$$

is the well-known BET plot for multilayer adsorption phenomena and is applicable in the moderate relative pressure region. The applicable pressure region for the BET plot is well-defined for nitrogen physisorption at 77 K ($0.05 < P/P_0 < 0.35$ for mesoporous materials and $P/P_0 < 0.05$ for microporous materials). However, a few reports have suggested that the BET plot for water adsorption can be applied in the relative pressure range of $0.05 < P/P_0 < 0.5$.

We chose data in the range $0.1 < P/P_0 < 0.35$, wherein the four BET plots show high linearity, to fit Equation 2 (not shown). The fitted linear correlations all had positive intercepts, implying that it is feasible to apply the BET model in the assumed pressure region. The fitted slope of the BET equation gives the monolayer water coverage $n_m$, and these values are summarized in Table 3.

A decrease of $n_m$ between bare and modified SWNTs clearly suggests that a certain fraction of silanols in the SWNT interior are substituted during surface modification and are hence unavailable for monolayer adsorption of water. Furthermore, the introduced reagents create hydrophobic regions in the SWNT. These two factors are responsible for a lower water uptake capacity of the modified SWNTs in both the intermediate and high-pressure regions. In contrast, the low-pressure region shows negligible differences, since the Henry's constant for initial water adsorption on available silanol sites remains essentially unaffected.

Fractional Silanol Substitution: In this section, we estimated the fractional surface silanol substitution after interior modifications by three introduced reagents, from the results of the different characterization techniques including nitrogen physisorption, TGA, $^{29}$Si-NMR, and water adsorption. The fractional silanol substitution is physically equivalent to the surface coverage of the introduced organic entities on the inner wall of the SWNT. The results are summarized in Table 4.

Conclusions: A methodology for modifying the interior of single-walled metal oxide (aluminosilicate) nanotubes by covalently immobilizing organic functional entities on the interior surface of the nanotube structure is reported. The resulting organic-modified SWNTs show higher hydrophobicity than bare nanotubes based upon water adsorption measurements. The degree of interior surface silanol substitution is estimated, with up to 35% of the silanols being substituted through the present modification chemistry (Table 4). This methodology of immobilizing various functional entities at the inner wall of aluminosilicate nanotubes opens up a range of previously inaccessible "molecular recognition"-based applications for nanotube materials in areas such as catalysis, molecular encapsulation, sensing, and separation.

We have successfully functionalized the inner surface of single-walled aluminosilicate nanotubes with several reagents (as illustrated in FIG. 11), and have provided the first unambiguous and comprehensive characterization to reveal the occurrence, extent, and structural details of the inner-surface functionalization. Furthermore, a comprehensive investigation of the resulting solids using nitrogen physisorption, powder X-ray diffraction (XRD), thermogravimetric analysis (TGA), $^{29}$Si and $^{13}$C solid-state NMR and water adsorption provides a detailed understanding of the porosity, structure, and surface chemistry of the functionalized nanotubes.

In particular, SWNTs modified with the three reagents preserve their nanotube structure, and the variation in size and type of reagents allows for the control of the pore volume of the SWNT. We have also demonstrated that different types of organic groups, including alkyl, alkoxy, or carbonyl groups, can be immobilized at the SWNT inner surface.

Water adsorption in the SWNTs is interpreted by the BET model to elucidate the adsorption mechanism in both bare and modified SWNTs. As an example of the potential applications, we show that the functionalization approach enables us to control the surface hydrophilicity as well as the water uptake of the SWNT.

Finally, estimates of fractional surface silanol substitution for the three modified SWNTs are achieved via different characterization techniques, and consistent results are obtained. The present study gives a clear basis for addressing the challenging problem of adding organic functionalities to the interiors of SWNT materials, and thereby greatly expands their potential applications. For example, by introducing appropriate functional groups, the SWNT can become an excellent candidate for size- and shape-selective catalytic reactions, sensing, molecular encapsulation, and molecular separations.

We claim:

1. A method for modifying an inner surface of a single walled metal oxide nanotube (SWNT), comprising heating the SWNT under vacuum at 250-300° C. until the SWNT has been dehydrated, followed by reacting the SWNT with a derivative under anhydrous conditions to produce a SWNT that is derivatized on its inner surface.

2. The method of claim 1, wherein the derivative comprises metals, halides, carboxylates, sulphates, nitrates, alkyls, aryls, or combinations thereof.

3. A method of dehydroxylating a single walled metal oxide nanotube (SWNT), comprising
heating the SWNT under vacuum at 300-340° C.; and
rehydroxylating the SWNT by exposure to water vapor according to the following scheme:

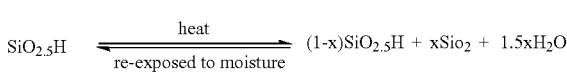

where $0 \leq x \leq 1$.

4. A method of modifying an inner surface of a single walled metal oxide nanotube (SWNT), comprising dehydrating the inner surface of the SWNT, and functionalizing the inner surface of the SWNT under anhydrous conditions.

5. The method of claim 4, wherein dehydrating the inner surface of the SWNT comprises heating the SWNT to a temperature of at least about 300° C.

6. The method of claim 4, wherein functionalizing the inner surface of the SWNT comprises contacting the SWNT with a reagent selected from the group of silanes, acid chlorides, and aminoalcohols in the presence of an organic solvent.

7. The method of claim 6, wherein the organic solvent is hexane or toluene or chloroform or combinations thereof.

8. The method of claim 6, wherein the reagent is acetyl chloride or aminoethanol or methyltrimethoxy-silane or trimethylmethoxysilane, or trichlorosilane.

9. A method for modifying an outer and an inner surface of a single walled metal oxide nanotube (SWNT), comprising first functionalizing the outer surface under aqueous conditions, second dehydrating the inner surface, and third functionalizing the inner surface under anhydrous conditions.

10. The method of claim 9, wherein the inner and the outer surface of the SWNT have the same or different functional groups added thereto.

11. A single walled aluminosilicate nanotube having an inner surface having Si—OH groups, and outer surface, wherein at least 5% of the Si—OH groups of the inner surface are functionalized.

12. A single walled metal oxide nanotube (SWNT) having an inner surface having —OH groups, and outer surface, wherein at least 5% of the —OH groups of the inner surface are functionalized.

13. The SWNT of claim 12, wherein at least 35% of the —OH groups of the inner surface are functionalized.

14. The SWNT of claim 12, wherein the inner surface is functionalized with a group selected from metals, halides, carboxylates, sulphates, nitrates, silanes, alkyls, aryls, acetyl chloride, aminoethanol, methyltrimethoxy-silane, trimethylmethoxysilane, trichlorosilane, and combinations thereof.

15. A single-walled aluminosilicate nanotube having an inner surface and an outer surface, wherein the inner surface is functionalized with a group selected from metals, halides, carboxylates, sulphates, nitrates, silanes, alkyls, aryls, acetyl chloride, aminoethanol, methyltrimethoxy-silane, trimethylmethoxysilane, trichlorosilane, and combinations thereof.

16. the method of claim 1, wherein the SWNT is heated under vacuum at 340° C.

17. The method of claim 1, wherein the SWNT is heated under vacuum at 300-340° C.

18. A single-walled aluminosilicate nanotube or single-walled oxide nanotube prepared according to the method of any of claim 1-2, 3-10 or 17-16.

* * * * *

UNITED STATES PATENT AND TRADEMARK OFFICE
CERTIFICATE OF CORRECTION

PATENT NO. : 8,637,693 B2  
APPLICATION NO. : 13/049375  
DATED : January 28, 2014  
INVENTOR(S) : Kang et al.

Page 1 of 1

It is certified that error appears in the above-identified patent and that said Letters Patent is hereby corrected as shown below:

Title page, item (73), please delete "Phillips 66 Company, Houston, TX (US)" and insert -- Georgia Tech Research Corporation, Atlanta, GA (US) --.

Signed and Sealed this
Twenty-fourth Day of March, 2015

Michelle K. Lee
*Director of the United States Patent and Trademark Office*